US012076997B2

(12) United States Patent
Kawai et al.

(10) Patent No.: US 12,076,997 B2
(45) Date of Patent: Sep. 3, 2024

(54) IMAGE RECORDING METHOD

(71) Applicant: FUJIFILM Corporation, Tokyo (JP)

(72) Inventors: Masaharu Kawai, Kanagawa (JP); Ryuji Shinohara, Kanagawa (JP); Yushi Hongo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 164 days.

(21) Appl. No.: 17/845,509

(22) Filed: Jun. 21, 2022

(65) Prior Publication Data
US 2022/0324235 A1 Oct. 13, 2022

Related U.S. Application Data

(63) Continuation of application No. PCT/JP2020/044076, filed on Nov. 26, 2020.

(30) Foreign Application Priority Data

Jan. 10, 2020 (JP) ................................. 2020-002641

(51) Int. Cl.
*B41J 11/00* (2006.01)
*B41J 2/045* (2006.01)
(Continued)

(52) U.S. Cl.
CPC .............. *B41J 2/17* (2013.01); *B41J 2/04573* (2013.01); *B41J 11/0015* (2013.01); *B41J 11/002* (2013.01); *B41M 5/0017* (2013.01)

(58) Field of Classification Search
CPC ....................................................... B41J 2/045
See application file for complete search history.

(56) References Cited

U.S. PATENT DOCUMENTS

2009/0233068 A1  9/2009 Irita
2012/0050432 A1  3/2012 Kawakami
(Continued)

FOREIGN PATENT DOCUMENTS

CN      1515427 A   7/2004
CN    101531089 A   9/2009
(Continued)

OTHER PUBLICATIONS

Ito, MachineTranslationofJP-2021014024-A, 2021 (Year: 2021).*
(Continued)

*Primary Examiner* — Scott A Richmond
(74) *Attorney, Agent, or Firm* — Sughrue Mion, PLLC

(57) ABSTRACT

Provided is an image recording method including an applying step of applying a pretreatment liquid containing water and an aggregating agent onto an impermeable base material and applying an ink containing water and a colorant onto a region of the impermeable base material where the pretreatment liquid has been applied, and a drying step of drying the ink applied onto the region to obtain an image, in which the drying step includes blowing of hot air at a wind speed of greater than 15 m/s to the ink applied onto the region, and in a case where the number of grams of the ink applied per 1 $m^2$ in an image area with a density of 100% is defined as X, and the number of grams of the pretreatment liquid applied per 1 $m^2$ in the image area with a density of 100% is defined as Y, a viscosity of a kneaded material obtained by adding (6.5Y/X) mg of the pretreatment liquid to 10 g of the ink and defoaming and kneading the mixture at 200 rpm for 5 minutes is in a range of 30 mPa·s to 500 mPa·s.

12 Claims, 1 Drawing Sheet

(51) Int. Cl.
   *B41J 2/17*      (2006.01)
   *B41M 5/00*      (2006.01)

(56) References Cited

U.S. PATENT DOCUMENTS

| | | |
|---|---|---|
| 2013/0076842 A1 | 3/2013 | Sarkisian et al. |
| 2018/0030300 A1 | 2/2018 | Ohta |
| 2018/0244094 A1 | 8/2018 | Okuda et al. |
| 2019/0168516 A1* | 6/2019 | Nakagawa ............. B41M 7/009 |
| 2020/0010708 A1 | 1/2020 | Sugihara et al. |

FOREIGN PATENT DOCUMENTS

| | | | |
|---|---|---|---|
| CN | 102285257 A | | 12/2011 |
| CN | 102407708 A | | 4/2012 |
| CN | 102884145 A | | 1/2013 |
| CN | 106916487 A | | 7/2017 |
| CN | 108504186 A | | 9/2018 |
| CN | 110248816 A | | 9/2019 |
| JP | 2004-154978 A | | 6/2004 |
| JP | 2005-280344 A | | 10/2005 |
| JP | 2007321110 A | * | 12/2007 |
| JP | 2017-069074 A | | 4/2017 |
| JP | 2018-15968 A | | 2/2018 |
| JP | 2021014024 A | * | 2/2021 ........ B41J 11/00216 |
| WO | 2017/069074 A1 | | 4/2017 |
| WO | 2018/179848 A1 | | 10/2018 |
| WO | 2018/181992 A1 | | 10/2018 |

OTHER PUBLICATIONS

Miyashita, MachineTranslationofJP-2007321110-A, 2007 (Year: 2007).*
Chinese Office Action dated Aug. 23, 2023 in Chinese Application No. 202080089166.9.
International Search Report issued Jan. 26, 2021 in International Application No. PCT/JP2020/044076.
Written Opinion of the International Searching Authority issued Jan. 26, 2021 in International Application No. PCT/JP2020/044076.
International Preliminary Report on Patentability issued Jul. 12, 2022 in International Application No. PCT/JP2020/044076.
Office Action issued May 16, 2023 in Japanese Application No. 2021-569756.
Office Action dated Feb. 12, 2023 from the China National Intellectual Property Administration in CN Application No. 202080089166.9.
Extended European Search Report issued Jun. 6, 2023 in Application No. 20912928.7.

* cited by examiner

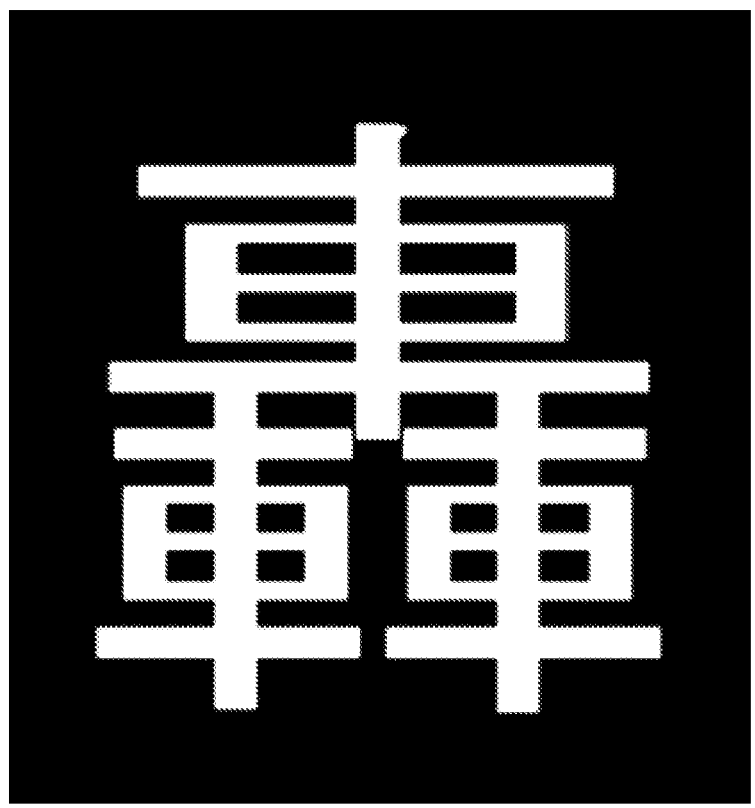

IMAGE RECORDING METHOD

CROSS-REFERENCE TO RELATED APPLICATIONS

This application is a continuation application of International Application No. PCT/JP2020/044076, filed Nov. 26, 2020, the disclosure of which is incorporated herein by reference in its entirety. Further, this application claims priority from Japanese Patent Application No. 2020-002641, filed Jan. 10, 2020, the disclosure of which is incorporated herein by reference in their entirety.

BACKGROUND OF THE INVENTION

1. Field of the Invention

The present disclosure relates to an image recording method.

2. Description of the Related Art

In recent years, an image recording method of recording an image using an ink and an aggregating agent that aggregates components in the ink has been examined.

WO2017/069074A discloses an image recording method including a step of jetting an aqueous ink containing a pigment and water from a nozzle of an ink jet head and allowing the aqueous ink to land on a region of a film where an image is recorded and a step of drying the film on which the aqueous ink has landed, in which the film is a film formed such that a pigment aggregating agent and a resin are attached to the region where an image is recorded.

SUMMARY OF THE INVENTION

Meanwhile, in an image recording method of applying a pretreatment liquid onto an impermeable base material, applying an ink onto a region of the impermeable base material where the pretreatment liquid has been applied, and drying the ink applied onto the region to obtain an image, improvement of the adhesiveness (hereinafter, also simply referred to as "adhesiveness of the image" or "adhesiveness") between the impermeable base material and the image is required in some cases.

It was found that as a method of improving the adhesiveness of the image, a method of blowing high-speed air which is hot air having a wind speed of greater than 15 m/sec to the ink applied onto the region to dry the ink is effective.

However, it was also found that with this method, the shape of the ink on the region is disturbed due to the blowing of high-speed air, and as a result, the image quality (that is, the accuracy) of the image to be recorded may be degraded.

Further, it was also found that streak-like image omission may occur in a case where degradation of the image quality is intended to be suppressed.

An object of one aspect of the present disclosure is to provide an image recording method that enables recording of a high-quality image with excellent adhesiveness on an impermeable base material and suppression of streak-like image omission in the image.

Specific means for achieving the above-described objects includes the following aspects.

<1> An image recording method comprising: a step of preparing a pretreatment liquid containing water and an aggregating agent; a step of preparing an ink containing water and a colorant; an applying step of applying the pretreatment liquid onto an impermeable base material and applying the ink onto a region of the impermeable base material where the pretreatment liquid has been applied; and a drying step of drying the ink applied onto the region to obtain an image, in which the drying step includes blowing of hot air at a temperature of 40° C. or higher and a wind speed of greater than 15 m/s to the ink applied onto the region, and in a case where the number of grams of the ink applied per 1 $m^2$ in an image area with a density of 100% is defined as X, and the number of grams of the pretreatment liquid applied per 1 $m^2$ in the image area with a density of 100% is defined as Y, a viscosity of a kneaded material at 25° C. obtained by adding (6.5Y/X) mg of the pretreatment liquid to 10 g of the ink and defoaming and kneading the mixture at 200 rpm for 5 minutes is in a range of 30 mPa·s to 500 mPa·s, and X is 2.0 or greater.

<2> The image recording method according to <1>, in which the wind speed of the hot air is 30 m/s or greater.

<3> The image recording method according to <1> or <2>, in which the wind speed of the hot air is 50 m/s or greater.

<4> The image recording method according to any one of <1> to <3>, in which the viscosity of the kneaded material is in a range of 50 mPa·s to 400 mPa·s.

<5> The image recording method according to any one of <1> to <4>, in which the viscosity of the kneaded material is in a range of 70 mPa·s to 300 mPa·s.

<6> The image recording method according to any one of <1> to <5>, in which X is in a range of 4.0 to 25.0.

<7> The image recording method according to any one of <1> to <6>, in which (6.5Y/X) is in a range of 0.3 to 2.5.

<8> The image recording method according to any one of <1> to <7>, in which a surface tension of the ink at 25° C. is in a range of 30 mN/m to 40 mN/m.

<9> The image recording method according to any one of <1> to <8>, in which a time from when liquid droplets of the ink land on the region of the impermeable base material to when the blowing of the hot air to the liquid droplets is started is in a range of 2 s to 15 s.

<10> The image recording method according to any one of <1> to <9>, in which a time from when the blowing of hot air to liquid droplets of the ink that have landed on the region of the impermeable base material is started to when the blowing of the hot air is ended is in a range of 10 s to 50 s.

<11> The image recording method according to any one of <1> to <10>, in which the pretreatment liquid further contains a resin.

<12> The image recording method according to any one of <1> to <11>, in which the ink further contains resin particles.

According to one aspect of the present disclosure, it is possible to provide an image recording method that enables recording of a high-quality image with excellent adhesiveness on an impermeable base material and suppression of streak-like image omission in the image.

BRIEF DESCRIPTION OF THE DRAWINGS

FIG. 1 is a conceptual view illustrating a character image recorded in an example.

DESCRIPTION OF THE PREFERRED EMBODIMENTS

In the present disclosure, a numerical range shown using "to" indicates a range including the numerical values described before and after "to" as a lower limit and an upper limit.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or a value described in an example.

In the present disclosure, the meaning of the term "step" includes not only an independent step but also a step whose intended purpose is achieved even in a case where the step is not clearly distinguished from other steps.

In the present disclosure, a combination of preferred embodiments is a more preferred embodiment.

In the present disclosure, the "image" indicates an entire film to be obtained by applying an ink onto an impermeable base material and drying the ink, and the "recording of an image" and the "image recording" respectively indicate formation of a film and film formation.

In the present disclosure, rpm denotes revolutions per minute.

<Image Recording Method>

An image recording method of the present disclosure includes a step of preparing a pretreatment liquid containing water and an aggregating agent; a step of preparing an ink containing water and a colorant; an applying step of applying the pretreatment liquid onto an impermeable base material and applying the ink onto a region of the impermeable base material where the pretreatment liquid has been applied; and a drying step of drying the ink applied onto the region to obtain an image, in which the drying step includes blowing of hot air at a temperature of 40° C. or higher and a wind speed of greater than 15 m/s to the ink applied onto the region, and in a case where the number of grams of the ink applied per 1 m$^2$ in an image area with a density of 100% (that is, a portion of a solid image with a halftone dot rate of 100%, the same applies hereinafter) is defined as X, and the number of grams of the pretreatment liquid applied per 1 m$^2$ in an image area with a density of 100% is defined as Y, a viscosity of a kneaded material at 25° C. (hereinafter, also simply referred to as "viscosity") obtained by adding (6.5Y/X) mg of the pretreatment liquid to 10 g of the ink and defoaming and kneading the mixture at 200 rpm for 5 minutes (hereinafter, also simply referred to as "kneaded material") is in a range of 30 mPa·s to 500 mPa·s, and X is 2.0 or greater.

The image recording method of the present disclosure may include other steps as necessary.

According to the image recording method of the present disclosure, a high-quality image with excellent adhesiveness can be recorded on an impermeable base material and streak-like image omission can be suppressed.

The reason why such an effect is exhibited is assumed as follows.

In the image recording method of the present disclosure, the drying step includes the blowing of hot air to the ink applied onto the region (hereinafter, the operation is also referred to as "hot air drying"), and the temperature of the hot air is 40° C. or higher and the wind speed of the hot air is greater than 15 m/s, and thus the adhesiveness of the image to the impermeable base material is improved.

The reason for this is not clear, but the drying efficiency of the ink is assumed to be improved because the ink applied onto the region can be heated by the heat of hot air at a temperature of 40° C. or higher and an evaporation substance of a component in the ink applied onto the region can be removed (that is, blown off) by hot air with a wind speed of greater than 15 m/s.

However, it was found that in a case where the wind speed of the hot air is greater than 15 m/s, the shape of the ink is disturbed due to the blowing of hot air, and as a result, the image quality (that is, the accuracy) of the image to be recorded may be degraded.

From this viewpoint, in the image recording method of the present disclosure, degradation of the image quality can be suppressed by setting the viscosity of the kneaded material to 30 mPa·s or greater. Here, the viscosity of the kneaded material is considered to have a correlation with the viscosity of the ink in a case of carrying out hot air drying (details will be described below). Therefore, the viscosity of the ink on the region in the case of carrying out hot air drying is ensured at a somewhat high level by setting the viscosity of the kneaded material to 30 mPa·s or greater, and as a result, the disturbance of the shape of the ink and degradation of the image quality can be suppressed.

Meanwhile, in a case where the viscosity of the ink on the region in the case of carrying out hot air drying is extremely high, streak-like image omission may occur.

From this viewpoint, in the image recording method of the present disclosure, the viscosity of the ink on the region in the case of carrying out hot air drying is suppressed to some extent by setting the viscosity of the kneaded material to 500 mPa·s or less, and as a result, streak-like image omission is suppressed.

In the image recording method of the present disclosure, it is considered that with the configuration described above, a high-quality image with excellent adhesiveness can be recorded on the permeable base material, and a streak-like image omission (hereinafter, also simply referred to as "streaks") can be suppressed.

Hereinafter, each step that can be included in the image recording method of the present disclosure will be described.

<Step of Preparing Pretreatment Liquid>

The image recording method of the present disclosure includes a step of preparing a pretreatment liquid containing water and an aggregating agent (hereinafter, also referred to as "pretreatment liquid preparing step").

The pretreatment liquid preparing step may be a step of simply preparing a pretreatment liquid that has been produced in advance or a step of producing a pretreatment liquid.

The method of producing a pretreatment liquid is not particularly limited, and a known method of mixing components can be employed.

(Water)

The pretreatment liquid contains water.

The content of water is preferably 50% by mass or greater and more preferably 60% by mass or greater with respect to the total amount of the pretreatment liquid.

The upper limit of the content of water depends on the amount of other components, but is preferably 90% by mass or less with respect to the total amount of the pretreatment liquid.

(Aggregating Agent)

The pretreatment liquid contains at least one aggregating agent.

The aggregating agent is a component for aggregating the components in the ink on the impermeable base material.

At least one selected from the group consisting of an organic acid, an organic acid salt, a polyvalent metal compound, and a metal complex is preferable as the aggregating agent.

Organic Acid

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

From the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Preferred examples of the organic compound containing a carboxy group include polyacrylic acid, acetic acid, formic acid, benzoic acid, glycolic acid, malonic acid, malic acid (preferably DL-malic acid), maleic acid, succinic acid, glutaric acid, fumaric acid, citric acid, tartaric acid, phthalic acid, adipic acid, 4-methylphthalic acid, lactic acid, pyrrolidone carboxylic acid, pyrrone carboxylic acid, pyrrole carboxylic acid, furan carboxylic acid, pyridine carboxylic acid, coumaric acid, thiophene carboxylic acid, nicotinic acid, and pimelic acid. These compounds may be used alone or in combination of two or more kinds thereof.

From the viewpoint of the aggregation rate of the ink, as the organic compound containing a carboxy group, a di- or higher valent carboxylic acid (hereinafter, also referred to as a polyvalent carboxylic acid) is preferable.

As the polyvalent carboxylic acid, a dicarboxylic acid or a tricarboxylic acid is preferable, glutaric acid, malonic acid, succinic acid, adipic acid, pimelic acid, malic acid, maleic acid, fumaric acid, tartaric acid, or citric acid is more preferable, glutaric acid, malonic acid, succinic acid, adipic acid, pimelic acid, malic acid, fumaric acid, tartaric acid, or citric acid is still more preferable, and glutaric acid, malonic acid, succinic acid, adipic acid, or pimelic acid is even still more preferable.

It is preferable that the organic acid has a low pKa (for example, 1.0 to 5.0).

In this manner, the surface charge of particles such as polymer particles or the pigment stably dispersed in the ink by a weakly acidic functional group such as a carboxy group is reduced by bringing the ink into contact with an organic acidic compound having a lower pKa to degrade the dispersion stability.

It is preferable that the organic acid has a low pKa and a high solubility in water and is di- or higher valent and more preferable that the organic acid is a di- or trivalent acidic substance which has a high buffer capacity in a pH region whose pKa is lower than the pKa of the functional group (for example, a carboxy group) that allows the particles to be stably dispersed in the ink.

Organic Acid Salt

Examples of the organic acid salt include salts of organic acids exemplified above.

Examples of the organic acid salt include organic acid salts containing alkaline earth metals of a group 2 (such as magnesium and calcium) in the periodic table, transition metals of a group 3 (such as lanthanum) in the periodic table, cations of a group 13 (such as aluminum) in the periodic table, and lanthanides (such as neodymium).

As the organic acid salt, an organic acid salt containing an alkaline earth metal is preferable, an organic acid salt containing calcium (such as calcium lactate or calcium acetate), or an organic acid salt containing magnesium (such as magnesium lactate or magnesium acetate) is more preferable.

Polyvalent Metal Compound

Examples of the polyvalent metal compound include a salt (here, excluding the organic acid salt) containing at least one selected from the group consisting of alkaline earth metals of a group 2 (such as magnesium and calcium) in the periodic table, transition metals of a group 3 (such as lanthanum) in the periodic table, cations of a group 13 (such as aluminum) in the periodic table, and lanthanides (such as neodymium).

As the polyvalent metal compound, a nitrate, a chloride, or a thiocyanate is suitable.

As the polyvalent metal compound, a calcium salt or a magnesium salt of nitric acid, calcium chloride, magnesium chloride, or a calcium salt or a magnesium salt of thiocyanic acid is particularly preferable.

Further, it is preferable that at least a part of the polyvalent metal compound is dissociated into polyvalent metal ions and counter ions in the pretreatment liquid.

Metal Complex

As the metal complex, a metal complex including at least one selected from the group consisting of zirconium, aluminum, and titanium as a metallic element is preferable.

As the metal complex, a metal complex including at least one selected from the group consisting of acetate, acetylacetonate, methylacetoacetate, ethylacetoacetate, octylene glycolate, butoxyacetylacetonate, lactate, lactate ammonium salt, and triethanol aminate as a ligand is preferable.

As the metal complex, various metal complexes are commercially available, and a commercially available metal complex may be used in the present disclosure. Further, various organic ligands, particularly various multidentate ligands that are capable of forming metal chelate catalysts are commercially available. Accordingly, a metal complex prepared by combining a commercially available organic ligand with a metal may be used.

The content of the aggregating agent is not particularly limited.

From the viewpoint of the aggregation rate of the ink, the content of the aggregating agent is preferably in a range of 0.1% by mass to 40% by mass, more preferably in a range of 0.1% by mass to 30% by mass, still more preferably in a range of 1% by mass to 20% by mass, even still more preferably in a range of 1% by mass to 10% by mass, and particularly preferably in a range of 2% by mass to 8% by mass with respect to the total amount of the pretreatment liquid.

(Resin)

It is preferable that the pretreatment liquid contains at least one resin.

In a case where the pretreatment liquid contains a resin, the adhesiveness of the image is further improved.

In the case where the pretreatment liquid contains a resin, the glass transition temperature (Tg) of the resin contained in the pretreatment liquid is preferably 0° C. or higher, more preferably 10° C. or higher, still more preferably 20° C. or higher, and even still more preferably 30° C. or higher.

In the case where the pretreatment liquid contains a resin, the glass transition temperature (Tg) of the resin contained in the pretreatment liquid is preferably 120° C. or lower, more preferably 100° C. or lower, still more preferably 80° C. or lower, and even still more preferably 70° C. or lower.

In the present disclosure, the glass transition temperature of the resin indicates a value measured using differential scanning calorimetry (DSC).

Specifically, the glass transition temperature is measured in conformity with the method described in JIS K 7121 (1987) or JIS K 6240 (2011).

The glass transition temperature in the present disclosure is an extrapolated glass transition start temperature (hereinafter, also referred to as Tig).

The method of measuring the glass transition temperature will be described in more detail.

In a case where the glass transition temperature is acquired, the resin is maintained at a temperature lower than the expected glass transition temperature of the resin by approximately 50° C. until the device is stabilized, the resin is heated to a temperature higher than the temperature at which the glass transition is completed by approximately 30° C. at a heating rate of 20° C./min, and a differential thermal analysis (DTA) curve or a DSC curve is created.

The extrapolated glass transition start temperature (Tig), that is, the glass transition temperature in the present disclosure is acquired as the temperature of the intersection between a straight line obtained by extending the base line on a low temperature side in the DTA curve or the DSC curve onto a high temperature side and a tangent drawn at a point where the gradient of a curve from a step-like change portion of the glass transition is maximized.

Further, in a case where the pretreatment liquid contains two or more kinds of resins, the glass transition temperature (Tg) of the resins in the pretreatment liquid indicates the weighted average value of the glass transition temperatures of the respective resins.

Examples of the resin that may be contained in the pretreatment liquid include an acrylic resin, a polyester resin, a polyolefin resin, a polyurethane resin, a polyurea resin, a polyamide resin, a polycarbonate resin, and a polystyrene resin.

The resins that can be contained in the pretreatment liquid include preferably a polyester resin or an acrylic resin and more preferably a polyester resin.

In the present disclosure, the acrylic resin indicates a polymer (a homopolymer or a copolymer) of a raw material monomer containing at least one selected from the group consisting of acrylic acid, a derivative of acrylic acid (such as acrylic acid ester), methacrylic acid, and a derivative of methacrylic acid (such as methacrylic acid ester).

Further, in the present disclosure, the polyester resin indicates a polymer compound having an ester bond in the main chain. Examples of the polyester resin include a polycondensate of polyvalent carboxylic acid (such as dicarboxylic acid) and polyalcohol (such as a diol).

Further, in the present disclosure, the polyolefin resin indicates a polymer (a homopolymer or a copolymer) of a raw material monomer containing an olefin. Examples of the polyolefin resin include a polymer of one kind of olefin, a copolymer of two or more kinds of olefins, and a copolymer of one or more kinds of olefins and one or more kinds of other monomers. Examples of the olefin include an α-olefin having 2 to 30 carbon atoms.

In the present disclosure, the polyurethane resin indicates a polymer compound having a urethane bond.

In the present disclosure, the polyurea resin indicates a polymer compound having a urea bond.

In the present disclosure, the polyamide resin indicates a polymer compound having an amide bond.

In the present disclosure, the polycarbonate resin indicates a polymer compound having a carbonate bond.

In the present disclosure, the polystyrene resin indicates a polymer of a raw material monomer containing styrene.

The resin that can be contained in the pretreatment liquid may be a water-soluble resin or a water-insoluble resin, but a water-insoluble resin is preferable.

In the present disclosure, the term "water-soluble" indicates a property in which 1 g or greater of a substance is dissolved in 100 g of water at 25° C. As the "water-soluble" property, a property in which 3 g or greater (more preferably 10 g or greater) of a substance is dissolved in 100 g of water at 25° C. is preferable.

In the present disclosure, the term "water-insoluble" indicates a property in which less than 1 g of a substance is dissolved in 100 g of water at 25° C. As the "water-insoluble" property, a property in which less than 0.5 g of a substance is dissolved in 100 g of water at 25° C. is preferable.

It is preferable that the pretreatment liquid contains resin particles.

It is preferable that the resin particles consist of a water-insoluble resin.

Further, acrylic resin particles, polyester resin particles, a kneaded material of acrylic resin particles and polyester resin particles, or composite particles containing an acrylic resin and a polyester resin are preferable as the resin particles.

The resin particles that can be contained in the ink, which will be described below in the section of "step of preparing ink" are also preferable as the resin particles.

The weight-average molecular weight (Mw) of the resin in the resin particles is preferably in a range of 1000 to 300000, more preferably in a range of 2000 to 200000, and still more preferably in a range of 5000 to 100000.

In the present disclosure, the weight-average molecular weight (Mw) indicates a value measured according to gel permeation chromatography (GPC) unless otherwise specified.

The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 µL, and a measurement temperature of 50° C. using an RI detector.

Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

The volume average particle diameter of the resin particles is preferably in a range of 1 nm to 300 nm, more preferably in a range of 3 nm to 200 nm, and still more preferably in a range of 5 nm to 150 nm.

In the present disclosure, the volume average particle diameter of the resin particles denotes a value measured by a particle size distribution measuring device (for example, MICROTRAC UPA (registered trademark) EX150, manufactured by NIKKISO CO., LTD.) using light scattering.

In a case of preparing the pretreatment liquid, a commercially available product of an aqueous dispersion liquid of resin particles may be used.

Examples of the commercially available product of an aqueous dispersion liquid of resin particles include PESRESIN A124GP, PESRESIN A645GH, PESRESIN A615GE, and PESRESIN A520 (all manufactured by Takamatsu Oil & Fat Co., Ltd.), Eastek 1100 and Eastek 1200 (both manufactured by Eastman Chemical Company), PLASCOAT RZ570, PLASCOAT Z687, PLASCOAT Z565, and PLASCOAT Z690 (all manufactured by Goo Chemical Co., Ltd.), VYLONAL MD1200 (manufactured by Toyobo Co., Ltd.), and EM57DOC (manufactured by Daicel Fine-Chem Ltd.).

In a case where the pretreatment liquid contains resin particles, the content of the resin particles is preferably in a range of 0.5% by mass to 30% by mass, more preferably in a range of 1% by mass to 20% by mass, and particularly preferably in a range of 1% by mass to 15% by mass with respect to the total amount of the pretreatment liquid.

(Water-Soluble Organic Solvent)

It is preferable that the pretreatment liquid contains at least one water-soluble organic solvent.

As the water-soluble organic solvent, known solvents can be used without particular limitation.

Examples of the water-soluble organic solvent include polyhydric alcohol such as glycerin, 1,2,6-hexanetriol, trimethylolpropane, alkanediol (for example, ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol), or polyalkylene glycol (for example, diethylene glycol, triethylene glycol, tetraethylene glycol, pentaethylene glycol, dipropylene glycol, or polyoxyethylene polyoxypropylene glycol); polyhydric alcohol ether such as polyalkylene glycol ether (for example, diethylene glycol monoalkyl ether, triethylene glycol monoalkyl ether, tripropylene glycol monoalkyl ether, or polyoxypropylene glyceryl ether); and alkyl alcohols having 1 to 4 carbon atoms, glycol ethers, 2-pyrrolidone, and N-methyl-2-pyrrolidone.

Among these, from the viewpoint of suppressing transfer of components, polyhydric alcohol or polyhydric alcohol ether is preferable, and alkanediol, polyalkylene glycol, or polyalkylene glycol ether is more preferable.

In a case where the pretreatment liquid contains a water-soluble organic solvent, the content of the water-soluble organic solvent is preferably in a range of 0.5% by mass to 30% by mass, more preferably in a range of 1% by mass to 20% by mass, and particularly preferably in a range of 1% by mass to 15% by mass with respect to the total amount of the pretreatment liquid.

As the water-soluble organic solvent that can be contained in the pretreatment liquid, a water-soluble organic solvent having a boiling point of lower than 220° C. is also preferable.

From the viewpoint of the drying properties of the pretreatment liquid, it is preferable that the pretreatment liquid does not contain an organic solvent having a boiling point of 220° C. or higher or the content of the organic solvent having a boiling point of 220° C. or higher is 5% by mass or less (more preferably 3% by mass or less, still more preferably 1% by mass or less) with respect to the total amount of the pretreatment liquid.

As specific examples of each of the water-soluble organic solvent having a boiling point of lower than 220° C. and the organic solvent having a boiling point of 220° C. or higher, the section of "step of preparing ink" described below can be referred to.

Other Components

The pretreatment liquid may contain other components in addition to the above-described components as necessary.

Examples of other components that may be contained in the pretreatment liquid include known additives such as a surfactant, a solid wetting agent, a silicic acid compound (such as colloidal silica), an inorganic salt, a fading inhibitor, an emulsion stabilizer, a penetration enhancer, an ultraviolet absorbing agent, a preservative, a fungicide, a pH adjuster, a viscosity adjuster, a rust inhibitor, a chelating agent, and a water-soluble polymer compound other than a water-soluble cationic polymer (for example, water-soluble polymer compounds described in paragraphs 0026 to 0080 of JP2013-001854A).

As other components that can be contained in the pretreatment liquid, components that can be contained in the ink, described below, can also be referred to.

(Physical Properties of Pretreatment Liquid)

From the viewpoint of the aggregation rate of the ink, the pH of the pretreatment liquid at 25° C. is preferably in a range of 0.1 to 3.5.

In a case where the pH of the pretreatment liquid is 0.1 or greater, the roughness of the impermeable base material is further decreased and the adhesiveness of the image area is further improved.

In a case where the pH of the pretreatment liquid is 3.5 or less, the aggregation rate is further improved, coalescence of dots (ink dots) caused by the ink on the surface of the impermeable base material is further suppressed, and the roughness of the image is further decreased.

The pH of the pretreatment liquid at 25° C. is more preferably in a range of 0.2 to 2.0.

The pH of the pretreatment liquid at 25° C. is measured using a commercially available pH meter.

In the case where the pretreatment liquid contains an aggregating agent, from the viewpoint of the aggregation rate of the ink, the viscosity of the pretreatment liquid at 25° C. is preferably in a range of 0.5 mPa·s to 10 mPa·s and more preferably in a range of 1 mPa·s to 5 mPa·s.

The viscosity of the pretreatment liquid at 25° C. is measured using a viscometer (for example, VISCOMETER TV-22 type viscometer, manufactured by Toki Sangyo Co., Ltd.).

The surface tension of the pretreatment liquid at 25° C. is preferably 60 mN/m or less, more preferably in a range of 20 mN/m to 50 mN/m, and still more preferably in a range of 30 mN/m to 45 mN/m.

The surface tension of the pretreatment liquid at 25° C. is measured using, for example, an Automatic Surface Tentiometer CBVP-Z (manufactured by Kyowa Interface Science Co., Ltd.).

<Step of Preparing Ink>

The image recording method of the present disclosure includes a step of preparing an ink containing water and a colorant (hereinafter, also referred to as "ink preparing step").

The ink preparing step may be a step of simply preparing the ink that has been produced in advance or a step of producing the ink.

A method of producing the ink is not particularly limited, and a known method of mixing components can be employed.

(Water)

The ink contains water.

The content of water is preferably 30% by mass or greater, preferably 40% by mass or greater, and still more preferably 50% by mass or greater with respect to the total amount of the ink.

The upper limit of the content of water depends on the amount of other components, but is preferably 90% by mass or less and more preferably 80% by mass or less with respect to the total amount of the ink.

(Colorant)

The ink contains at least one colorant.

The colorant is not particularly limited, and a known colorant (such as a pigment or a dye) can be used, but a pigment is preferable, and an organic pigment or an inorganic pigment is more preferable.

Examples of the organic pigment include an azo pigment, a polycyclic pigment (such as a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment, or a quinophthalone pigment), a chelate dye, a nitro pigment, a nitroso pigment, and aniline black.

Examples of the inorganic pigment include a white inorganic pigment, iron oxide, barium yellow, cadmium red, chrome yellow, and carbon black. A preferred embodiment of the white inorganic pigment will be described below.

Examples of the pigment include the pigments described in paragraphs 0096 to 0100 of JP2009-241586A.

The ink containing a chromatic pigment or a black pigment as the pigment can be used as, for example, a color ink (for example, a cyan ink, a magenta ink, or a yellow ink) or a black ink.

Further, the ink in a case of containing a white pigment (for example, a white inorganic pigment) as the pigment can be used as, for example, a white ink (hereinafter, also referred to as "white ink").

Further, the ink in a case of containing a white pigment and a pigment of a color other than white as the pigment can also be used as an ink in which a chromatic tint is added to the white color.

Examples of the white inorganic pigment include titanium dioxide ($TiO_2$), barium sulfate, calcium carbonate, aluminum hydroxide, silica, zinc oxide, zinc sulfide, mica, talc, and pearl. Among the examples of the white inorganic pigment, titanium dioxide, barium sulfate, calcium carbonate, or zinc oxide is preferable, and titanium dioxide is more preferable.

The average primary particle diameter of the white inorganic pigment is, for example, in a range of 150 nm to 400 nm.

In a case where the average primary particle diameter thereof is 150 nm or greater, the covering property is further improved. Here, the concealing property is a property of concealing the ground with an image (for example, a white image).

Further, in a case where the average primary particle diameter thereof is 400 nm or less, the jettability of the ink is further improved.

The average primary particle diameter of the white inorganic pigment is preferably in a range of 250 nm to 350 nm and more preferably in a range of 250 nm to 300 nm.

The average primary particle diameter of the white inorganic pigment is a value measured using a transmission electron microscope (TEM). A transmission electron microscope 1200EX (manufactured by JEOL Ltd.) can be used for the measurement.

Specifically, the average primary particle diameter is defined as a value obtained by adding the ink diluted to 1000 times dropwise to Cu200 mesh (manufactured by JEOL Ltd.) to which a carbon film has been attached, drying the ink, measuring the equivalent circle diameters of 300 independent particles that do not overlap each other in the image enlarged at a magnification of 100000 times using a TEM, and simply averaging the measured values.

The content of the colorant is preferably in a range of 1% by mass to 20% by mass, more preferably in a range of 1% by mass to 15% by mass, and still more preferably in a range of 1% by mass to 10% by mass with respect to the total amount of the ink.

(Pigment Dispersion Resin)

The ink in an aspect of containing a pigment may contain a pigment dispersion resin.

The ink in this case contains a resin-coated pigment having a structure in which at least a part of the surface of the pigment is coated with the pigment dispersion resin.

A water-insoluble resin is preferable as the pigment dispersion resin.

An acrylic resin is preferable as the pigment dispersion resin.

Examples of the pigment dispersion resin include the pigment dispersion resins described in WO2013/180074A, JP5863600B, JP2018-28080A, JP2017-149906A, and JP2016-193981A. The pigment dispersion resin is also referred to as "resin dispersant" or the like.

Further, as a combination of the pigment and the pigment dispersion resin, for example, a resin-coated pigment coated with a pigment by a crosslinked water-soluble resin described in JP5404669B may be employed. The resin-coated pigment in this case can be prepared by, for example, using an acrylic resin containing a carboxy group as a water-soluble resin and a bifunctional or higher functional epoxy compound as a crosslinking agent.

From the viewpoint of the adsorptivity to the pigment, the pigment dispersion resin has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, a norbornane ring structure, an isobornane ring structure, a norbornene ring structure, an isobornene ring structure, or an adamantane ring structure is preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the pigment dispersion resin.

From the viewpoint of the performance of dispersing the pigment, it is preferable that the pigment dispersion resin contains an ionic group in the structure.

The ionic group may be an anionic group or a cationic group, but an anionic group is preferable.

The anionic group is not particularly limited, but a carboxy group, a salt of the carboxy group, a sulfo group, or a salt of the sulfo group is preferable.

From the viewpoints of the pigment dispersibility and the preservation stability, the acid value of the resin dispersant is preferably in a range of 30 mgKOH/g to 100 mgKOH/g, more preferably in a range of 30 mgKOH/g to 85 mgKOH/g, and still more preferably in a range of 50 mgKOH/g to 85 mgKOH/g.

Here, the acid value is defined as the mass (mg) of KOH required to completely neutralize 1 g of a resin and is measured by the method described in JIS standard (JIS K 0070, 1992).

The weight-average molecular weight (Mw) of the pigment dispersion resin is preferably 30000 or greater, more preferably in a range of 30000 to 150000, still more preferably in a range of 30000 to 100000, and even still more preferably in a range of 30000 to 80000.

In a case where the ink contains the pigment dispersion resin, the content of the pigment dispersion resin is preferably in a range of 1% by mass to 25% by mass, more preferably in a range of 1% by mass to 20% by mass, still more preferably in a range of 1% by mass to 15% by mass, and even still more preferably in a range of 1% by mass to 10% by mass with respect to the total amount of the ink.

In a case where the ink contains the pigment dispersion resin, the ratio of the pigment dispersion resin (D) to the pigment (P) (that is, the D/P ratio) is preferably in a range of 0.05 to 3, more preferably in a range of 0.05 to 2, still more preferably in a range of 0.05 to 1, and even still more preferably in a range of 0.05 to 0.7.

(Resin Particles)

It is preferable that the ink contains at least one kind of resin particles.

In a case where the ink contains resin particles, the adhesiveness of the image to be recorded is further improved.

Here, the resin particles are distinguished from the pigment dispersion resin described above in terms that the particles consist of a resin.

A water-insoluble resin is preferable as the resin constituting the resin particles.

In a case where the ink contains resin particles, the resin particles in the ink are aggregated in a case where the resin particles in the ink and the aggregating agent in the pretreatment liquid come into contact with each other on the impermeable base material so that the ink is thickened. Therefore, in a case where the ink contains resin particles, the adhesiveness of the image is further improved as compared with a case where the ink does not contain the resin particles.

Further, in the case where the ink contains resin particles, an increase in viscosity of the ink is further suppressed as compared with a case where the ink contains the same mass of a water-soluble resin as the mass of the resin particles. As a result, the jettability (hereinafter, also simply referred to as "jettability of the ink") of the ink from an ink jet head in a case of using the ink as an inkjet ink is further improved.

The glass transition temperature of the resin particles (that is, the glass transition temperature of the resin in the resin particles) is not particularly limited.

From the viewpoint of further improving the strength of the image, the glass transition temperature (Tg) of the resin particles is preferably 20° C. or higher, more preferably 50° C. or higher, and still more preferably 80° C. or higher.

From the viewpoint of the manufacturing suitability of the resin particles, the glass transition temperature (Tg) of the resin particles is preferably 200° C. or lower, more preferably 150° C. or lower, and still more preferably 130° C. or lower.

In the method of producing an image recorded material of the present disclosure, from the viewpoint of further improving the adhesiveness of the image, it is preferable that the pretreatment liquid contains a resin, the ink contains resin particles, and the glass transition temperature of the resin contained in the pretreatment liquid is lower than the glass transition temperature of the resin particles contained in the ink.

In this case, the value obtained by subtracting the glass transition temperature of the resin contained in the pretreatment liquid from the glass transition temperature of the resin particles contained in the ink is preferably 20° C. or higher, more preferably 30° C. or higher, and still more preferably 50° C. or higher.

The upper limit of the value is not particularly limited, and the upper limit thereof may be 100° C., 150° C., 200° C., or the like.

As the resin particles, particles consisting of an acrylic resin (hereinafter, also referred to as acrylic resin particles), particles consisting of a polyester resin (hereinafter, also referred to as polyester resin particles), particles consisting of a polyurethane resin (hereinafter, also referred to as polyurethane resin particles), or particles consisting of a polyolefin resin (hereinafter, also referred to as polyolefin resin particles) are preferable.

From the viewpoint of further improving the adhesiveness and the rub resistance of the image, the resin particles contained in the ink contain preferably at least one of acrylic resin particles or polyurethane resin particles and more preferably acrylic resin particles.

In a case where the resin particles contained in the ink include acrylic resin particles, the proportion of the acrylic resin particles in the resin particles contained in the ink is preferably 60% by mass or greater, more preferably 80% by mass or greater, and still more preferably 90% by mass or greater.

In a case where the proportion of the acrylic resin particles in the resin particles contained in the ink is 60% by mass or greater, the adhesiveness of the image is further improved.

As the resin particles, self-dispersing resin particles are preferable.

Examples of the self-dispersing resin particles include self-dispersing polymer particles described in paragraphs 0062 to 0076 of JP2016-188345A and paragraphs 0109 to 0140 of WO2013/180074A.

The resin in the resin particles has preferably an alicyclic structure or an aromatic ring structure and more preferably an alicyclic structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, a norbornene ring structure, an isobornane ring structure, a norbornene ring structure, an isobornene ring structure, or an adamantane ring structure is preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the resin contained in the resin particles.

From the viewpoint of further improving the dispersibility of the resin particles in water, it is preferable that the resin contained in the resin particles contains an ionic group in the structure.

The ionic group may be an anionic group or a cationic group, but an anionic group is preferable.

The anionic group is not particularly limited, but a carboxy group, a salt of the carboxy group, a sulfo group, or a salt of the sulfo group is preferable.

As the resin in resin particles, an acrylic resin having at least one selected from the group consisting of a benzyl (meth)acrylate unit, a phenoxyethyl (meth)acrylate unit, and an alicyclic structure-containing (meth)acrylate unit, and a (meth)acrylic acid unit is more preferable, and an acrylic resin having at least one selected from the group consisting of a benzyl (meth)acrylate unit, a phenoxyethyl (meth) acrylate unit, and an alicyclic structure-containing (meth) acrylate unit, a (meth)acrylic acid unit, and an alkyl (meth) acrylate unit that contains an alkyl group having 1 to 4 carbon atoms is still more preferable.

As the alicyclic structure-containing (meth)acrylate, at least one selected from alkyl (meth)acrylate containing a cycloalkyl group having 3 to 10 carbon atoms (such as cyclohexyl (meth)acrylate), isobornyl (meth)acrylate, adamantyl (meth)acrylate, and dicyclopentanyl (meth)acrylate is preferable, and at least one selected from isobornyl (meth)acrylate, adamantyl (meth)acrylate, or dicyclopentanyl (meth)acrylate is more preferable.

From the viewpoint of the self-dispersibility, the aggregating properties in a case of image recording, and the like, the acid value of the resin in the resin particles is preferably in a range of 25 mgKOH/g to 100 mgKOH/g, more preferably in a range of 30 mgKOH/g to 90 mgKOH/g, and still more preferably in a range of 35 mgKOH/g to 80 mgKOH/g.

The molecular weight of the resin in the resin particles is preferably in a range of 1000 to 300000, more preferably in a range of 2000 to 200000, and still more preferably in a range of 5000 to 100000 in terms of the weight-average molecular weight.

The weight-average molecular weight is measured by gel permeation chromatography (GPC). The details of GPC are as described above.

The volume average particle diameter of the resin particles is preferably in a range of 1 nm to 200 nm, more preferably in a range of 3 nm to 200 nm, and still more preferably in a range of 5 nm to 50 nm.

In a case where the ink contains resin particles, the content of the resin particles is preferably in a range of 1% by mass to 25% by mass, more preferably in a range of 2% by mass to 20% by mass, still more preferably in a range of 2% by mass to 15% by mass, and even still more preferably in a range of 2% by mass to 10% by mass with respect to the total amount of the ink.

(Water-Soluble Organic Solvent Having Boiling Point of Lower than 220° C.)

It is preferable that the ink contains at least one water-soluble organic solvent having a boiling point of lower than 220° C. In this manner, the jettability of the ink can be further improved.

In the present disclosure, the boiling point is a boiling point at 1 atm (101325 Pa).

Examples of the water-soluble organic solvent having a boiling point of lower than 220° C. include 1,2-propanediol (also referred to as propylene glycol; PG) (boiling point of 188° C.), 1,3-propanediol (boiling point of 213° C.), propylene glycol monomethyl ether (boiling point of 121° C.), ethylene glycol (boiling point of 197° C.), ethylene glycol monomethyl ether (boiling point of 124° C.), propylene glycol monoethyl ether (boiling point of 133° C.), ethylene glycol monoethyl ether (boiling point of 135° C.), propylene glycol monopropyl ether (boiling point of 149° C.), ethylene glycol monopropyl ether (boiling point of 151° C.), propylene glycol monobutyl ether (boiling point of 170° C.), ethylene glycol monobutyl ether (boiling point of 171° C.), 2-ethyl-1-hexanol (boiling point of 187° C.), dipropylene glycol monomethyl ether (boiling point of 188° C.), diethylene glycol dimethyl ether (boiling point of 162° C.), diethylene glycol diethyl ether (boiling point of 188° C.), and dipropylene glycol dimethyl ether (boiling point of 175° C.).

In a case where the ink contains a water-soluble organic solvent having a boiling point of lower than 220° C., the content of the water-soluble organic solvent having a boiling point of lower than 220° C. is preferably in a range of 1% by mass to 50% by mass, more preferably in a range of 5% by mass to 40% by mass, still more preferably in a range of 10% by mass to 40% by mass, and even still more preferably in a range of 15% by mass to 35% by mass with respect to the total amount of the ink.

(Water-Soluble Organic Solvent Having Boiling Point of 220° C. or Higher)

The content of the water-soluble organic solvent having a boiling point of 220° C. or higher (hereinafter, also referred to as "high-boiling point solvent") in the ink is preferably 5% by mass or less. In this manner, the adhesiveness of the image is improved.

Here, the expression "the content of the water-soluble organic solvent having a boiling point of 220° C. or higher in the ink is 5% by mass or less" denotes that the ink does not contain the water-soluble organic solvent having a boiling point of 220° C. or higher (that is, the content of the water-soluble organic solvent having a boiling point of 220° C. or higher in the ink is 0% by mass) or even in a case where the ink contains the water-soluble organic solvent having a boiling point of 220° C. or higher, the content of the water-soluble organic solvent having a boiling point of 220° C. or higher is 5% by mass or less with respect to the total amount of the ink.

The content of the water-soluble organic solvent having a boiling point of 220° C. or higher in the ink is more preferably 3% by mass or less, still more preferably 2% by mass or less, even still more preferably 1% by mass or less, and even still more preferably 0% by mass.

Examples of the water-soluble organic solvent having a boiling point of 220° C. or higher include glycerin (boiling point of 290° C.), 1,2-hexanediol (HDO) (boiling point of 223° C.), diethylene glycol (boiling point of 245° C.), diethylene glycol monobutyl ether (boiling point of 230° C.), triethylene glycol (boiling point of 285° C.), dipropylene glycol (boiling point of 232° C.), tripropylene glycol (boiling point 267° C.), trimethylolpropane (boiling point of 295° C.), 2-pyrrolidone (boiling point of 245° C.), tripropylene glycol monomethyl ether (boiling point of 243° C.), and triethylene glycol monomethyl ether (boiling point of 248° C.).

(Water-Insoluble Organic Solvent)

The ink may contain at least one kind of water-insoluble organic solvent.

Here, the content of the water-insoluble organic solvent in the ink is preferably 3% by mass or less, more preferably 2% by mass or less, still more preferably 1% by mass or less, even still more preferably less than 1% by mass, and even still more preferably 0% by mass.

(Surfactant)

The ink may contain at least one kind of surfactant.

Examples of the surfactant include a nonionic surfactant, a cationic surfactant, an anionic surfactant, and a betaine surfactant.

Preferred examples of the surfactant include an acetylene glycol-based surfactant, which is a kind of a nonionic surfactant.

As the acetylene glycol-based surfactant, for example, the acetylene glycol-based surfactants described in paragraphs 0070 to 0080 of WO2017/149917A can be used.

Examples of the acetylene glycol-based surfactant include a polyalkylene oxide adduct (preferably a polyethylene oxide adduct) of 2,4,7,9-tetramethyl-5-decyne-4,7-diol, a polyalkylene oxide adduct (preferably a polyethylene oxide adduct) of 3,6-dimethyl-4-octyne-3,6-diol, a polyalkylene oxide adduct (preferably a polyethylene oxide adduct) of 2,5,8,11-tetramethyl-6-dodecyne-5,8-diol, and a polyalkylene oxide adduct (preferably a polyethylene oxide adduct) of 2,5-dimethyl-3-hexyne-2,5-diol.

Examples of commercially available products of the acetylene glycol-based surfactant include the SURFYNOL Series (such as SURFYNOL 420, SURFYNOL 440, SURFYNOL 465, and SURFYNOL 485), OLFINE Series (such as OLFINE E1010 and OLFINE E1020), and DYNOL Series (such as DYNOL 604) (all manufactured by Air Products and Chemicals Inc. or Nissin Chemical Co., Ltd.), and ACETYLENOL (manufactured by Kawaken Fine Chemicals Co., Ltd.).

Commercially available products of the acetylene glycol-based surfactants are also provided by The Dow Chemical Company, General Aniline & Film Corporation, and the like.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based (fluorinated alkyl-based) surfactants and silicone-based surfactants described in JP2003-322926A, JP2004-325707A, and JP2004-309806A.

In a case where the ink contains a surfactant, the content of the surfactant in the ink is appropriately adjusted in consideration of the surface tension of the ink.

The content of the surfactant in the ink is preferably in a range of 0.01% by mass to 5% by mass, more preferably in a range of 0.05% by mass to 3% by mass, and still more preferably in a range of 0.1% by mass to 2% by mass with respect to the total amount of the ink.

Other Components

The ink may contain components other than the components described above.

Examples of other components include known additives such as a silicic acid compound (such as colloidal silica), urea, a urea derivative, a wax, a fading inhibitor, an emulsion stabilizer, a penetration enhancer, an ultraviolet absorbing agent, a preservative, a fungicide, a pH adjuster, an antifoaming agent, a viscosity adjuster, a dispersion stabilizer, and a chelating agent.

(Preferable Physical Properties of Ink)

The viscosity of the ink at 25° C. is preferably in a range of 1.2 mPa·s to 15.0 mPa·s, more preferably 2 mPa·s or greater and less than 13 mPa·s, and still more preferably 2.5 mPa·s or greater and less than 10 mPa·s.

The viscosity of the ink at 25° C. is measured using a viscometer (for example, VISCOMETER TV-22 type viscometer, manufactured by Toki Sangyo Co., Ltd.).

The surface tension of the ink at 25° C. is preferably in a range of 25 mN/m to 50 mN/m, more preferably in a range of 25 mN/m to 45 mN/m, and still more preferably in a range of 30 mN/m to 40 mN/m.

In a case where the surface tension of the ink is 25 mN/m or greater, the image quality is further improved.

In a case where the surface tension of the ink is 50 mN/m or less, streak-like image unevenness is further suppressed. The reason for this is considered to be that the insufficient spread of the ink is suppressed.

The effect of suppressing streak-like image unevenness in a case where the surface tension of the ink is 50 mN/m or less is significantly exhibited particularly in a case where heating and drying operations (such as heating with a hot plate or heating by irradiation with infrared rays) other than the hot air blowing are started first in the drying step and blowing of hot air is started. The reason for this is considered to be that the surface tension of the ink is 50 mN/m or less, and thus heat convection in the ink during other heating and drying operations is suppressed.

The surface tension of the ink at 25° C. is measured using a surface tentiometer (for example, Automatic Surface Tentiometer CBVP-Z, manufactured by Kyowa Interface Science Co., Ltd.).

The pH of the ink at 25° C. is preferably in a range of 6 to 11, more preferably in a range of 7 to 10, and still more preferably in a range of 7 to 9.

The pH of the ink at 25° C. is measured using a commercially available pH meter.

<Applying Step>

The image recording method of the present disclosure includes an applying step of applying the pretreatment liquid onto the impermeable base material and applying the ink onto the region of the impermeable base material where the pretreatment liquid has been applied.

(Impermeable Base Material)

In the image recording method of the present disclosure, the impermeable base material indicates a base material having a water absorption rate (% by mass, 24 hr.) of less than 0.2 according to ASTMD 570 of the ASTM test method.

The impermeable base material is not particularly limited, but a resin base material is preferable.

The resin base material is not particularly limited, and examples thereof include a thermoplastic resin base material.

Examples of the resin base material include a base material obtained by molding a thermoplastic resin in the form of a sheet or film.

As the resin base material, a base material containing polypropylene, polyethylene terephthalate, nylon, polyethylene, or polyimide is preferable.

The resin base material may be a transparent resin base material.

Here, the term "transparent" indicates that the transmittance of visible light having a wavelength of 400 nm to 700 nm is 80% or greater (preferably 90% or greater).

Further, the resin base material may be colored.

The shape of the resin base material is not particularly limited, but a sheet-shaped resin base material is preferable. From the viewpoint of the productivity of a medium to be recorded, a sheet-shaped resin base material which is capable of forming a roll by being wound is more preferable.

The thickness of the resin base material is preferably in a range of 10 μm to 200 μm and more preferably in a range of 10 μm to 100 μm.

The resin base material may be subjected to a surface treatment from the viewpoint of improving the surface energy.

Examples of the surface treatment include a corona treatment, a plasma treatment, a heat treatment, an abrasion treatment, a light irradiation treatment (UV treatment), and a flame treatment, but the surface treatment is not limited thereto.

(Application of Pretreatment Liquid)

In the applying step, the pretreatment liquid is applied onto the impermeable base material.

In the applying step, the application of the pretreatment liquid onto the impermeable base material can be performed by applying a known method such as a coating method, an ink jet method, or a dipping method.

Examples of the coating method include known coating methods using a bar coater (such as a wire bar coater), an extrusion die coater, an air doctor coater, a blade coater, a rod coater, a knife coater, a squeeze coater, a reserve roll coater, a gravure coater, or a flexo coater.

The details of the inkjet method will be described below.

Further, the impermeable base material may be heated before the application of the pretreatment liquid in the applying step.

The heating temperature is set such that the temperature of the impermeable base material is preferably in a range of 20° C. to 50° C. and more preferably in a range of 25° C. to 50° C.

In the applying step, the pretreatment liquid may be heated and dried after the application of the pretreatment liquid and before the application of the ink.

Examples of the method of heating and drying the pretreatment liquid include a method of blowing hot air, a method of using a hot plate, and a method of using an infrared heater. As the method of heating and drying the pretreatment liquid, a combination of a plurality of the above-described methods may be applied.

The heating temperature of heating and drying the pretreatment liquid is preferably 35° C. or higher and more preferably 50° C. or higher.

The upper limit of the heating temperature is not particularly limited, and the upper limit thereof is preferably 100° C., more preferably 90° C., and still more preferably 70° C.

The time of heating and drying the pretreatment liquid is not particularly limited, but is preferably in a range of 0.5 seconds to 60 seconds, more preferably in a range of 0.5 seconds to 20 seconds, and particularly preferably in a range of 0.5 seconds to 10 seconds.

(Application of Ink)

In the applying step, the ink is applied onto the region of the impermeable base material where the pretreatment liquid has been applied.

The ink can also be applied by employing a known method such as a coating method, an ink jet method, or a dipping method. Among these, an ink jet method is preferable.

The method of jetting the ink in the ink jet method is not particularly limited, and any of known methods such as an electric charge control method of jetting an ink using electrostatic attraction force; a drop-on-demand method (pressure pulse method) using a vibration pressure of a piezoelectric element; an acoustic ink jet method of allowing an ink to be jetted using a radiation pressure by converting an electric signal into an acoustic beam and irradiating the ink with the acoustic beam; and a thermal ink jet (bubble jet (registered trademark)) method of heating an ink to form air bubbles and utilizing the generated pressure may be used.

As an ink jet method, particularly, an ink jet method, described in JP1979-59936A (JP-S54-59936A), of jetting an ink from a nozzle using an action force caused by a rapid change in volume of the ink after being subjected to an action of thermal energy can be effectively used.

Further, as an ink jet method, the method described in paragraphs 0093 to 0105 of JP2003-306623A can also be employed.

The application of the ink according to the ink jet method is performed by allowing a nozzle of an ink jet head to jet the ink.

Examples of the system of the ink jet head include a shuttle system of performing recording while scanning a short serial head in the width direction of a medium to be recorded and a line system of using a line head in which recording elements are aligned in correspondence with the entire area of one side of a medium to be recorded.

In the line system, image recording can be performed on the entire surface of the medium to be recorded by scanning the medium to be recorded in a direction intersecting the direction in which the recording elements are aligned. In the line system, a transport system such as a carriage that scans a short head in the shuttle system is not necessary. Further, in the line system, since movement of a carriage and complicated scanning control between the head and the medium to be recorded are not necessary as compared with the shuttle system, only the medium to be recorded moves. Therefore, according to the line system, image recording at a higher speed than that of the shuttle system can be realized.

It is preferable to apply the ink using an ink jet head having a resolution of 300 dpi or greater (more preferably 600 dpi and still more preferably 800 dpi). Here, dpi stands for dot per inch, and 1 inch is 2.54 cm.

From the viewpoint of obtaining a high-definition image, the liquid droplet amount of the ink to be jetted from the nozzle of the ink jet head is preferably in a range of 1 pL (pico liter) to 10 pL and more preferably in a range of 1.5 pL to 6 pL.

Further, from the viewpoints of improving the image unevenness and improving connection of continuous gradations, it is also effective that the ink is jetted by combining different liquid droplet amounts.

A preferable application amount (Y) of the pretreatment liquid and a preferable application amount (X) of the ink in the applying step will be described below.

<Drying Step>

The image recording method of the present disclosure includes a drying step of drying the ink applied onto a region of the impermeable base material where the pretreatment liquid has been applied, to obtain an image.

The drying step includes blowing of hot air (that is, hot air drying) at a temperature of 50° C. or higher and a wind speed of greater than 15 m/s to the ink applied onto the region.

(Hot Air Drying)

In the drying step, the ink applied onto the region is heated and drying at least by hot air drying (that is, blowing of hot air), and thus an image is obtained.

Since the drying step includes hot air drying, the adhesiveness of the image to the impermeable base material is further improved as compared with a case where the drying step does not include hot air drying.

The wind speed of hot air is greater than 15 m/s. In this manner, the adhesiveness of the image is improved.

From the viewpoint of further improving the adhesiveness of the image, the wind speed of the hot air is preferably 20 m/s or greater, more preferably 30 m/s or greater, still more preferably 50 m/s or greater, and still more preferably 70 m/s or greater.

The upper limit of the wind speed of hot air is not particularly limited. From the viewpoint of further improving the image quality of the image, the upper limit of the wind speed of hot air is preferably 150 m/s, more preferably 100 m/s, and still more preferably 90 m/s.

The wind speed of hot air is measured at a position where the distance from an outlet of hot air in a hot air source is T1. Here, T1 denotes a distance equal to the distance from the outlet of the hot air to the ink applied onto the above-described region.

The temperature of hot air is 40° C. or higher.

In this manner, the adhesiveness of the image is improved.

From the viewpoint of further improving the adhesiveness of the image, the temperature of the hot air is preferably 50° C. or higher, more preferably 60° C. or higher, and still more preferably 70° C. or higher.

The upper limit of the temperature of hot air is not particularly limited. From the viewpoint of further reducing the damage to the impermeable base material, the upper limit of the temperature of hot air is preferably 100° C. and more preferably 90° C.

The temperature of hot air is also measured at a position where the distance from the outlet of hot air in the hot air source is T1 (that is, the distance equal to the distance from the outlet of hot air to the ink applied onto the above-described region).

Both the wind speed of hot air and the temperature of hot air are measured by using a thermal wind speed sensor (for example, a thermal wind speed sensor "TA10 Series", manufactured by Sentronic K. K.).

<Time from Landing of Ink to Start of Hot Air Drying>

In the image recording method of the present disclosure, liquid droplets of the ink land on the region of the impermeable base material where the pretreatment liquid has been applied in the applying step, and hot air is blown to the liquid droplets in the drying step.

In the image recording method of the present disclosure, the time from when the liquid droplets of the ink land on the region of the impermeable base material where the pretreatment liquid has been applied to when the blowing of the hot air to the liquid droplets is started (hereinafter, also referred to as "time from the ink landing to the start of hot air") is appropriately adjusted, but is preferably in a range of 2 s to 20 s.

In a case where the time from the ink landing to the start of hot air is 2 s or longer, there are few restrictions on a device for performing the image recording method.

In a case where the time from the ink landing to the start of hot air is 20 s or shorter, the productivity of image recording is excellent.

The time from the ink landing to the start of hot air is more preferably in a range of 2 s to 15 s, still more preferably in a range of 3 s to 10 s, and particularly preferably in a range of 3 s to 8 s.

<Time from Start of Hot Air to End of Hot Air>

In the image recording method of the present disclosure, the time from when the blowing of hot air to the liquid droplets of the ink that have landed on the region of the impermeable base material where the pretreatment liquid has been applied is started to when the blowing of the hot air is ended (hereinafter, also referred to as "time from the start of hot air to the end of hot air") is appropriately adjusted, but is preferably in a range of 10 s to 80 s.

The time from the start of hot air to the end of hot air corresponds to the time of blowing hot air to the liquid droplets of the ink (that is, the time of hot air drying).

In a case where the time from the start of hot air to the end of hot air is 10 s or longer, the adhesiveness of the image is further improved.

In a case where the time from the start of hot air to the end of hot air is 80 s or shorter, the productivity of image recording is more excellent.

The time from the start of hot air to the end of hot air is more preferably in a range of 10 s to 50 s, still more preferably in a range of 15 s to 50 s, and particularly preferably in a range of 20 s to 40 s.

<Other Heating and Drying Operations>

The drying step may further include other heating and drying operations in addition to the blowing of hot air (hereinafter, also referred to as "other heating and drying operations").

The other heating and drying operations may be an operation of directly heating the ink applied onto the region of the impermeable base material where the pretreatment liquid has been applied or an operation of heating the ink applied onto the region through the impermeable base material.

Examples of the other heating and drying operations include a heating and drying operation carried out using a hot plate (for example, an operation of heating the ink through the impermeable base material by placing the impermeable base material to which ink has been applied, on a hot plate), and an operation of heating the ink by irradiating the ink applied onto the region with infrared rays.

Further, other heating and drying operations may be started first, and the blowing of hot air is started in the drying step. On the contrary, hot air drying may be started first, and other heating and drying operations are started in the drying step.

In both cases, a time zone for which both the other heating and drying operations and the hot air drying are performed may be present.

<Relationship Between Ink and Pretreatment Liquid (Viscosity of Kneaded Material)>

As described above, the ink in the present disclosure is an ink containing water and a colorant, and the pretreatment liquid in the present disclosure is a pretreatment liquid containing water and an aggregating agent.

In the present disclosure, in a case where the number of grams of the ink applied per 1 $m^2$ in an image area with a density of 100% is defined as X [unit: $g/m^2$], and the number of grams of the pretreatment liquid applied per 1 $m^2$ in the image area with a density of 100% is defined as Y [unit: $g/m^2$], the viscosity of a kneaded material at 25° C. obtained by adding (6.5Y/X) mg of the pretreatment liquid to 10 g of the ink and defoaming and kneading the mixture at 200 rpm for 5 minutes is in a range of 30 mPa·s to 500 mPa·s.

In the present disclosure, the viscosity of the kneaded material is a value that correlates with the viscosity of the ink (that is, the degree of aggregation of the ink) at the time at which the blowing of hot air is started in the drying step.

Specifically, the mass ratio of the ink and the pretreatment liquid in the kneaded material is determined according to the applied mass ratio (Y/X) of the ink and the pretreatment liquid in the applying step.

More specifically, the mass ratio between the ink and the pretreatment liquid in the kneaded material is defined as the mass ratio of (6.5Y/X) mg of the pretreatment liquid to 10 g of the ink such that the viscosity thereof is set to be in a range of 30 mPa·s to 500 mPa·s, which is a range with satisfactory measurement reliability, as the measurement result of the viscosity.

The viscosity of the kneaded material increases as the degree of aggregation in the kneaded material (specifically, the degree of aggregation of the components in the ink due to the action of the pretreatment liquid) increases.

In a case where the viscosity of the kneaded material is 30 mPa·s or greater, the disturbance of the shape of the ink due to the blowing of hot air with a wind speed of greater than 15 m/s is suppressed, and as a result, degradation of the image quality due to the blowing of hot air with a wind speed of greater than 15 m/s is suppressed.

In a case where the viscosity of the kneaded material is 500 mPa·s or less, the occurrence of streak-like image omission (that is, streaks in the image) is suppressed.

From the viewpoint of further improving the image quality, the viscosity of the kneaded material is preferably 40 mPa·s or greater, more preferably 50 mPa·s or greater, still more preferably 60 mPa·s or greater, and even still more preferably 70 mPa·s or greater.

From the viewpoint of further suppressing streak-like image omission, the viscosity of the kneaded material is preferably 450 mPa·s or less, more preferably 400 mPa·s or less, still more preferably 350 mPa·s or less, and even still more preferably 300 mPa·s or less.

From the viewpoint of more effectively achieving both improvement of the image quality and suppression of streak-like image omission, the viscosity of the kneaded material is preferably in a range of 40 mPa·s to 450 mPa·s, more preferably in a range of 50 mPa·s to 400 mPa·s, still more preferably in a range of 60 mPa·s to 350 mPa·s, and even still more preferably in a range of 70 mPa·s to 300 mPa·s.

Specific examples of means for adjusting the viscosity of the kneaded material to be in a range of 30 mPa·s to 500 mPa·s include adjustment of the applied mass ratio (Y/X), optimization of the combination of the composition of the ink and the composition of the pretreatment liquid, and optimization of the kind and the concentration (content) of the aggregating agent in the pretreatment liquid.

In the present disclosure, the kneaded material is prepared by adding (6.5Y/X) mg of the pretreatment liquid to 10 g of the ink and defoaming and kneading the mixture at 200 rpm for 5 minutes.

The mixture is defoamed and kneaded by a kneading machine with a defoaming function (for example, a rotating and revolving mixer "Awatori Rentaro (registered trademark)" Series, manufactured by Thinky Corporation).

The viscosity of the kneaded material is measured by a rheometer (for example, rheometer MCR301, manufactured by Anton Paar GmbH) using the kneaded material at 25° C.

In the present disclosure, as X, Y, and (6.5Y/X), values with one decimal place obtained by rounding off the second digit after the decimal point are employed.

<X; Number of Grams (g/m$^2$) of Ink Applied per 1 m$^2$ in Image Area with Density of 100%>

In the present disclosure, X (that is, the number of grams (g/m$^2$) of the ink applied per 1 m$^2$ in an image area with a density of 100%) is 2.0 or greater. X is 2.0 or greater, and this contributes to suppression of streak-like image omission. From the viewpoint of further suppressing streak-like image omission, X is preferably 4.0 or greater.

The upper limit of X is not particularly limited, but X is preferably 25.0 or less from the viewpoint of further improving the image quality.

From the viewpoint of improving image quality and suppressing streak-like image omission, X is preferably in a range of 4.0 to 25.0.

<Y; Number of Grams (g/m$^2$) of Pretreatment Liquid Applied per 1 m$^2$ in Image Area with Density of 100%>

In the present disclosure, Y (that is, the number of grams (g/m$^2$) of the pretreatment liquid applied per 1 m$^2$ in an image area with a density of 100%) is not particularly limited.

From the viewpoint of further improving the image quality, Y is preferably 0.3 or greater, more preferably 0.4 or greater, and still more preferably 0.8 or greater.

From the viewpoint of further suppressing streak-like image omission, Y is preferably 2.0 or less, more preferably 1.8 or less, and still more preferably 1.6 or less.

<"6.5Y/X">

"6.5Y/X" is a value that correlates with the applied mass ratio (Y/X) of the pretreatment liquid to the ink in the image area with a density of 100%.

In the present disclosure, "6.5Y/X" is preferably in a range of 0.3 to 2.5.

In a case where "6.5Y/X" is 0.3 or greater, insufficient aggregation of the ink is further suppressed, and as a result, the image quality is further improved. From the viewpoint of further improving the image quality, "6.5Y/X" is more preferably 0.4 or greater and still more preferably 0.5 or greater.

In a case where "6.5Y/X" is 2.5 or less, overaggregation of the ink is further suppressed, and as a result, streak-like image omission is further suppressed. From the viewpoint of further suppressing streak-like image omission, "6.5Y/X" is preferably 2.0 or less, more preferably 1.8 or less, and still more preferably 1.6 or less.

Examples

Hereinafter, examples of the present disclosure will be described below, but the present disclosure is not limited to the following examples.

Hereinafter, "%" and "part" respectively indicate "% by mass" and "part by mass" unless otherwise specified.

As "water", ion exchange water was used.

<Preparation of Pretreatment Liquid>

A pretreatment liquid UC1, a pretreatment liquid UC2, and a pretreatment liquid UC3 were respectively prepared in the following manner.

<Preparation of Pretreatment Liquid UC1>

The components having the following composition were kneaded to prepare the pretreatment liquid UC1.

Composition of Pretreatment Liquid UC1

Malonic acid (manufactured by FUJIFILM Wako Pure Chemical Corporation; aggregating agent (organic acid)): 4% by mass Resin particles P1 shown below: 5% by mass as solid content of resin particles P1 shown below Propylene glycol (PG) (manufactured by FUJIFILM Wako Pure Chemical Corporation; water-soluble organic solvent): 10% by mass Water: remaining amount set such that total amount of composition was 100% by mass Preparation of Aqueous Dispersion Liquid of Resin Particles P1

As an aqueous dispersion liquid of the resin particles P1, "PESRESIN A-520" (manufactured by Takamatsu Oil & Fat Co., Ltd., 30 mass % aqueous dispersion liquid of polyester resin particles (Tg of 50° C.) as resin particles P1) was prepared.

(Preparation of Pretreatment Liquids UC2 and UC3)

The pretreatment liquids UC2 and UC3 were respectively prepared in the same manner as in the preparation of the pretreatment liquid UC1 except that the composition of the pretreatment liquid was changed as listed in Table 1.

TABLE 1

| | Pretreatment liquid No. | | UC1 | UC2 | UC3 |
|---|---|---|---|---|---|
| Composition (% by mass) | Resin particles P1 | | 10 | 10 | 10 |
| | Aggregating agent | Malonic acid | 4 | 1 | — |
| | | Calcium chloride | — | — | 4 |
| | Water-soluble organic solvent | PG | 10 | 10 | 10 |
| | | Water | Remaining amount | Remaining amount | Remaining amount |

<Preparation of Ink>

Inks C1 to C7, which were cyan inks, were respectively prepared.

Hereinafter, the details will be described.

(Synthesis of Pigment Dispersion Resin 1)

88 g of methyl ethyl ketone was added to a 1000 mL three-neck flask provided with a stirrer and a cooling pipe and heated at 72° C. in a nitrogen atmosphere, and a solution obtained by dissolving 0.85 g of dimethyl 2,2'-azobisisobutyrate, 60 g of benzyl methacrylate, 10 g of methacrylic acid, and 30 g of methyl methacrylate in 50 g of methyl ethyl ketone was added dropwise thereto for 3 hours. After completion of the dropwise addition, the solution was allowed to further react for 1 hour, a solution obtained by dissolving 0.42 g of dimethyl 2,2'-azobisisobutyrate in 2 g of methyl ethyl ketone was added thereto, and the solution was heated to 78° C. and further heated for 4 hours. The obtained reaction solution was reprecipitated twice in a large excess amount of hexane, and the deposited resin was dried. In this manner, 96 g of a pigment dispersion resin 1 which was a benzyl methacrylate/methyl methacrylate/methacrylic acid copolymer (=60/30/10 [mass ratio]) was obtained.

The composition of the obtained pigment dispersion resin 1 was confirmed by $^1$H-NMR, and the weight-average molecular weight (Mw) acquired by GPC in terms of polystyrene was 44600. Further, the acid value acquired by the method described in JIS standard (JISK0070:1992) was 65.2 mgKOH/g.

(Preparation of Pigment Dispersion Liquid C)

C.I. Pigment Blue 15:3 (manufactured by Dainichiseika Color & Chemicals Mfg. Co., Ltd.) (4 parts) as a cyan pigment, the pigment dispersion resin 1 (2 parts) obtained in the above-described manner, methyl ethyl ketone (42 parts), a 1N NaOH aqueous solution (5.5 parts), and water (87.2 parts) were kneaded and dispersed at 2500 rpm for 6 hours using 0.1 mmip zirconia beads with a bead mill. The obtained dispersion liquid was concentrated under reduced pressure at 55° C. until methyl ethyl ketone was sufficiently distilled off, a part of water was further removed, a centrifugal treatment (using a 50 mL centrifuge tube) was performed at 8000 rpm for 30 minutes using a high-speed centrifugal cooler 7550 (manufactured by Kubota Corporation) so that the precipitate was removed, thereby recovering the supernatant.

As described above, a pigment dispersion liquid C containing a resin-coated pigment in which at least a part of the cyan pigment was coated with the pigment dispersion resin 1 was obtained.

(Preparation of Aqueous Dispersion Liquid of Resin Particles 1)

An aqueous dispersion liquid of resin particles 1 which were acrylic resin particles was prepared as follows.

A 2 L three-neck flask (reaction container) provided with a stirrer, a thermometer, a reflux condenser, and a nitrogen gas introduction pipe was charged with 560.0 g of methyl ethyl ketone, and the solution was heated to 87° C. Next, a mixed solution formed of 220.4 g of methyl methacrylate, 301.6 g of isobornyl methacrylate, 58.0 g of methacrylic acid, 108 g of methyl ethyl ketone, and 2.32 g of "V-601" (polymerization initiator, manufactured by FUJIFILM Wako Pure Chemical Corporation, dimethyl 2,2'-azobis(2-methyl propionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1): A solution formed of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours (the operation carried out so far is referred to as the "reaction").

After completion of the reaction, the temperature of the solution was lowered to 65° C., 163.0 g of isopropanol was added thereto, and the solution was allowed to be naturally cooled, thereby obtaining a polymerization solution containing a copolymer (concentration of solid contents of 41.0% by mass).

Next, 317.3 g of the obtained polymerization solution was weighed, 46.4 g of isopropanol, 1.65 g of a 20 mass % maleic acid anhydride aqueous solution (water-soluble acidic compound, corresponding to 0.3% by mass as maleic acid with respect to the copolymer), and 40.77 g of a 2 mol/L sodium hydroxide (NaOH) aqueous solution were added to the solution, and the temperature of the liquid in the reaction container was increased to 70° C.

Next, 380 g of distilled water was added dropwise to the liquid which had been heated to 70° C., at a speed of 10 mL/min, to carry out dispersion in water (dispersion step).

Thereafter, a total amount of 287.0 g of isopropanol, methyl ethyl ketone, and distilled water was distilled off by maintaining the temperature of the liquid in the reaction container at 70° C. for 1.5 hours under reduced pressure (solvent removal step). 0.278 g (440 mass ppm as benzisothiazolin-3-one as the solid content of the polymer) of PROXEL GXL (S) (manufactured by Arch Chemicals, Inc.) was added to the obtained liquid.

The obtained liquid was filtered through a filter with a pore size of 1 μm, and the filtrate was collected, thereby obtaining an aqueous dispersion liquid (nonvolatile content concentration of 23.2% by mass) of the resin particles 1 formed of a copolymer of methyl methacrylate, isobornyl methacrylate, methacrylic acid, and sodium methacrylate at a mass ratio of 70/20/5/5.

The volume average particle diameter of the resin particles 1 was 5.0 nm, the weight-average molecular weight (Mw) of the resin in the resin particles 1 was 60000, and the Tg of the resin particles 1 was 150° C.

(Preparation of Ink C1)

An ink C1 with the following composition was prepared using the pigment dispersion liquid C, the aqueous dispersion liquid of the resin particles 1, propylene glycol (hereinafter, also referred to as "PG"; water-soluble organic solvent having a boiling point of lower than 220° C.), propylene glycol monomethyl ether (hereinafter, also referred to as "PGmME"; water-soluble organic solvent having a boiling point of lower than 220), a surfactant (OLFINE (registered trademark) E1010, manufactured by Nisshin Chemical Co., Ltd.), and water.

Composition of Ink C1

Resin-coated cyan pigment: 4% by mass (breakdown; cyan pigment (3.2% by mass) and pigment dispersion resin 1 (1.8% by mass))

Propylene glycol (PG; water-soluble organic solvent with a boiling point of lower than 220° C.): 20% by mass Propylene glycol monomethyl ether (PGmME; water-soluble organic solvent with a boiling point of lower than 220° C.): 6% by mass Surfactant (OLFINE (registered trademark) E1010, manufactured by Nisshin Chemical Co., Ltd.): 1% by mass Resin particles 1: 6% by mass
Water: remaining amount set such that total amount of composition was 100% by mass
(Preparation of Inks C2 to C7)

Each of inks C2 to C7 was prepared in the same manner as in the preparation of the ink C1 except that the composition of the ink was changed as listed in Table 2.

The resin particles 2 are urethane resin particles. In the preparation of the ink containing the resin particles 2, a urethane emulsion "WBR-2101" (nonvolatile content concentration of 25% by mass, manufactured by Taisei Fine Chemicals Co., Ltd.) was used as the aqueous dispersion liquid of the resin particles 2.

The resin particles 3 are polyester resin particles. In the preparation of the ink containing the resin particles 3, "PESRESIN A615GE" (manufactured by Takamatsu Oil & Fat Co., Ltd., nonvolatile content concentration of 25% by mass) was used as the aqueous dispersion liquid of the resin particles 3.

2-EH denotes 2-ethylhexanol, which is a water-insoluble organic solvent.

<Measurement of Surface Tension of Ink>

The surface tension of each of the inks C1 to C7 was measured at 25° C. using, for example, an Automatic Surface Tentiometer CBVP-Z (manufactured by Kyowa Interface Science Co., Ltd.).

The results are listed in Table 2.

referred to as "only hot air"), an image recording device A including a transport system for transporting a base material, a bar coater, a hot air device 1, an ink jet head, and a hot air device 2 fixedly disposed in this order from the upstream side to the downstream side of the base material in the transport direction was prepared.

Hereinafter, details of each element of the image recording device A will be described.

The bar coater is a coating device for applying (specifically coating) the pretreatment liquid onto the base material.

The hot air device 1 is a device for blowing hot air to the pretreatment liquid applied onto the base material to dry the pretreatment liquid.

The ink jet head is an ink jet head for applying the ink onto the region of the base material where the pretreatment liquid has been applied and is a 1200 dpi/20 inch-width piezo full line head.

The hot air device 2 is a hot air device for blowing hot air in the drying step in the present disclosure. In the present example, an image is obtained by blowing hot air to the ink applied onto the region of the base material where the pretreatment liquid has been applied, using the hot air device 2, to dry the ink.

(Image Recording A ("Only Hot Air" as Drying Method in Drying Step))

The base material (OPP film), the pretreatment liquid, and the ink were set in the image recording device A.

TABLE 2

| | Ink. No. | | C1 | C2 | C3 | C4 | C5 | C6 | C7 |
|---|---|---|---|---|---|---|---|---|---|
| Composition (% by mass) | Resin-coated cyan pigment | | 4 | 4 | 4 | 4 | 4 | 4 | 4 |
| | Water-soluble organic solvent | PG (b.p. < 220° C.) | 20 | 20 | 20 | 20 | 20 | 20 | 20 |
| | | PGmME (b.p. < 220° C.) | 6 | 6 | 6 | 6 | 6 | 6 | 6 |
| | Water-insoluble organic solvent | 2-EH | — | — | — | — | 1 | — | 0.6 |
| | Resin particles | Resin particles 1 (acrylic resin particles) | 6 | — | — | 6 | 6 | 6 | 6 |
| | | Resin particles 2 (urethane resin particles) | — | 6 | — | — | — | — | — |
| | | Resin particles 3 (polyester resin particles) | — | — | 6 | — | — | — | — |
| | Surfactant | OLFINE E1010 | 1 | 1 | 1 | 0.1 | 1 | 0.4 | 1 |
| | | Water | Remaining amount | Remaining amount | Remaining amount | Remaining amount | Remaining amount | Remaining amount | Remaining amount |
| | Surface tension (mN/m) | | 35 | 35 | 35 | 43 | 28 | 40 | 30 |

Examples 1 to 27 and Comparative Examples 1 to 8

Each pretreatment liquid and each ink were used in the combinations listed in Tables 3 and 4, and any of the following image recording A to image recording C was performed and the obtained images were evaluated as follows. In addition, the viscosity of the kneaded material was measured.

<Image Recording>
(Impermeable Base Material)

A biaxially oriented polypropylene (OPP) film (thickness of 12 μm, completion of corona discharge treatment, manufactured by Futamura Chemical Co., Ltd.) was prepared as the impermeable base material (hereinafter, also simply referred to as "base material") in the present example.

(Image Recording Device A)

As an image recording device for performing image recording A in which the drying method in the drying step was performed only by hot air drying (hereinafter, also An image was recorded by transporting the base material and performing the following operations on the base material during the transport.

The pretreatment liquid was applied to the corona discharge treatment surface of the base material using a bar coater, and hot air was blown at a temperature of 60° C. and a wind speed of 5 m/s to the applied pretreatment liquid using the hot air device 1, thereby drying the pretreatment liquid. The time of drying the pretreatment liquid was set to 5 s. The ink was applied onto the dried pretreatment liquid (that is, onto the region where the pretreatment liquid had been applied) at a drive frequency of 30 kHz using an ink jet head (hereinbefore, the applying step).

Next, hot air was blown at the temperature and the wind speed listed in Table 3 and Table 4 to the ink applied onto the region where the pretreatment liquid had been applied, using the hot air device 2, thereby drying the ink (hereinbefore, the drying step).

In the above-described manner, an image was obtained.

The image was formed such that characters with a size of 3 pt (point), 4 pt, 5 pt, and 7 pt were arranged in a region where the ink had not been applied, in the background which was an area of a cyan color with a density of 100% (solid portion). The characters in FIG. 1 were used as the characters in the image.

X (g/m$^2$) which is the number of grams of the ink applied per 1 m$^2$ in the image area with a density of 100% and Y (g/m$^2$) which is the number of grams of the pretreatment liquid applied per 1 m$^2$ in an image area with a density of 100% were respectively adjusted to be the values listed in Table 3 and Table 4.

In the image recording, the time of drying the ink by hot air (that is, the time from the start of hot air to the end of hot air) and the time (s) from the ink landing to the start of hot air were adjusted to be the values listed in Table 3 and Table 4.

(Image Recording Device B)

An image recording device B was prepared as an image recording device for performing image recording B in which the drying method in the drying step was a drying method of performing hot plate (HP) drying and hot air drying in this order (hereinafter, also referred to as "HP→hot air").

The structure of the image recording device B is the same as the structure of the image recording device A except that a hot plate is disposed between the ink jet head and the hot air device 2.

(Image Recording B ("HP→Hot Air" as Drying Method in Drying Step))

An image was obtained by performing the image recording B ("HP→hot air" as the drying method in the drying step) in the same manner as in the image recording A except that hot plate (HP) drying was performed before hot air drying in the drying step.

The hot plate (HP) drying was performed by bringing the surface of the base material where the ink had not been applied (that is, the surface on a side opposite to the surface onto which the ink had been applied) into contact with the hot plate.

The temperature of the hot plate and the drying time using the hot plate were respectively adjusted to be the values listed in Table 3.

(Image Recording C ("only HP" as Drying Method in Drying Step))

Image recording C ("only HP" as the drying method in the drying step) was performed in the same manner as the image recording B except that the hot air drying (blowing of hot air) was not performed and the temperature of the hot plate and the drying time using the hot plate were respectively adjusted to be the values listed in Table 4 in the drying step.

<Measurement of Viscosity of Kneaded Material>

A kneaded material was obtained by adding (6.5Y/X) mg of the pretreatment liquid to 10 g of the ink and defoaming and kneading the mixture at 200 rpm for 5 minutes. The mixture was defoamed and kneaded by a rotating and revolving mixer "Awatori Rentaro (registered trademark) ARE-250" (manufactured by Thinky Corporation).

The viscosity of the obtained kneaded material at 25° C. was measured by a rheometer MCR301 (manufactured by Anton Paar GmbH).

The results are listed in Tables 3 and 4.

<Evaluation of Image Quality of Image>

The images recorded by the above-described image recording were observed, and the image quality of the images was evaluated according to the following evaluation standards.

The results are listed in Tables 3 and 4.

In the evaluation standards, the rank of the most excellent image quality of the image is "5".

Evaluation Standards for Image Quality
  5: Characters with all sizes (3 pt, 4 pt, 5 pt, and 7 pt) were formed without crushing and bleeding.
  4: Crushing or bleeding was observed in 3 pt characters, but 4 pt, 5 pt, and 7 pt characters were formed without crushing and bleeding.
  3: Crushing or bleeding was observed in each of the 3 pt and 4 pt characters, but each of the 5 pt and 7 pt characters was formed without crushing and bleeding.
  2: Crushing or bleeding was observed in each of the 3 pt, 4 pt, and 5 pt characters, but 7 pt characters were formed without crushing and bleeding.
  1: Crushing or bleeding was observed in characters with all sizes (3 pt, 4 pt, 5 pt, and 7 pt).

<Evaluation of Streaks (That is, Streak-Like Image Omission)>

A solid cyan image without characters (that is, an image consisting of only an area with a density of 100%) was recorded in the same manner as in the image recording except that the region where the ink had been applied was changed.

An observation area with a size of 8 mm×8 mm in the obtained solid image was observed with an optical microscope, and the occupancy ratio of streaks (that is, streak-like image omission) in the observation area was acquired by an image treatment (binarization treatment). Based on the obtained results, the streaks were evaluated according to the following evaluation standards.

The results are listed in Tables 3 and 4.

In the following evaluation standards, the rank in which the streaks of the image were most suppressed is 5.

Evaluation Standards for Streaks
  5: The streak occupancy ratio was 0% (that is, no streaks occurred).
  4: The streak occupancy ratio was greater than 0% and less than 1%.
  3: The streak occupancy ratio was 1% or greater and less than 3%.
  2: The streak occupancy ratio was 3% or greater and less than 5%.
  1: The streak occupancy ratio was 5% or greater.

<Adhesiveness of Image>

A solid cyan image without characters (that is, an image consisting of only an area with a density of 100%) was recorded in the same manner as in the evaluation of streaks.

A tape adhesion test of attaching plant-based tape (width of 12 mm) (manufactured by NICHIBAN Co., Ltd.) to the obtained solid image and peeling off the tape was performed.

Based on the obtained results, the adhesiveness of the image was evaluated according to the following evaluation standards.

The results are listed in Tables 3 and 4.

In the evaluation standards, the rank of the most excellent adhesiveness of the image is "5".

Evaluation Standards for Adhesiveness
  5: Adhesive matter was not found on the piece of tape, and peeling of the solid image on the base material was also not found.
  4: A small amount of colored adhesive matter was found on the piece of tape, but peeling of the solid image on the base material was not found.
  3: A small amount of colored adhesive matter was found on the piece of tape, and slight peeling of the solid image on the base material was found, but it was in a practically acceptable range.

2: Colored adhesive matter was found on the piece of tape, peeling of the solid image on the base material was also found, and it was in a practically acceptable range.

1: Colored adhesive matter was found on the piece of tape, most of the solid image on the base material was peeled off, the base material was visually recognized, and it was out of a practically acceptable range.

TABLE 3

| | Pre-treatment liquid | | Ink | | | | Viscosity of kneaded material (mPa·s) | | HP | | Drying step | | | | Evaluation result | | |
|---|---|---|---|---|---|---|---|---|---|---|---|---|---|---|---|---|---|
| | | | | Surface tension (mN/m) | X (g/m²) | 6.5Y/X | | Drying method | HP Temperature (°C.) | HP time (s) | Wind speed of hot air (m/s) | Temperature of hot air (°C.) | Time from ink landing to start of hot air (s) | Time from start of hot air to end of hot air (s) | | | |
| | No. | Y (g/m²) | No. | | | | | | | | | | | | Image quality | Streak | Adhesiveness |
| Example 1 | UC1 | 1.5 | C1 | 35 | 7.5 | 1.3 | 280 | Only hot air | — | — | 20 | 80 | 5 | 15 | 5 | 5 | 2 |
| Example 2 | UC1 | 1.5 | C1 | 35 | 7.5 | 1.3 | 280 | Only hot air | — | — | 30 | 80 | 5 | 15 | 5 | 5 | 3 |
| Example 3 | UC1 | 1.5 | C1 | 35 | 7.5 | 1.3 | 280 | Only hot air | — | — | 50 | 80 | 5 | 15 | 5 | 5 | 4 |
| Example 4 | UC1 | 1.5 | C1 | 35 | 7.5 | 1.3 | 280 | Only hot air | — | — | 70 | 80 | 5 | 15 | 5 | 5 | 5 |
| Example 5 | UC1 | 1.5 | C1 | 35 | 7.5 | 1.3 | 280 | Only hot air | — | — | 100 | 80 | 5 | 15 | 4 | 5 | 5 |
| Example 6 | UC1 | 2.3 | C1 | 35 | 7.5 | 2.0 | 450 | Only hot air | — | — | 70 | 80 | 5 | 15 | 5 | 3 | 5 |
| Example 7 | UC1 | 0.4 | C1 | 35 | 7.5 | 0.3 | 40 | Only hot air | — | — | 70 | 80 | 5 | 15 | 3 | 5 | 5 |
| Example 8 | UC1 | 2.1 | C1 | 35 | 7.5 | 1.8 | 350 | Only hot air | — | — | 70 | 80 | 5 | 15 | 5 | 4 | 5 |
| Example 9 | UC1 | 0.5 | C1 | 35 | 7.5 | 0.4 | 60 | Only hot air | — | — | 70 | 80 | 5 | 15 | 4 | 5 | 5 |
| Example 10 | UC1 | 0.6 | C1 | 35 | 7.5 | 0.5 | 80 | Only hot air | — | — | 70 | 80 | 5 | 15 | 5 | 5 | 5 |
| Example 11 | UC1 | 1.5 | C1 | 35 | 23.0 | 0.4 | 33 | Only hot air | — | — | 70 | 80 | 5 | 15 | 3 | 5 | 5 |
| Example 12 | UC1 | 0.7 | C1 | 35 | 2.0 | 2.3 | 490 | Only hot air | — | — | 70 | 80 | 5 | 15 | 5 | 3 | 5 |
| Example 13 | UC1 | 1.1 | C1 | 35 | 4.0 | 1.8 | 350 | Only hot air | — | — | 70 | 80 | 5 | 15 | 5 | 4 | 5 |
| Example 14 | UC1 | 1.5 | C2 | 35 | 7.5 | 1.3 | 140 | Only hot air | — | — | 70 | 80 | 5 | 15 | 5 | 5 | 3 |
| Example 15 | UC3 | 1.5 | C1 | 35 | 7.5 | 1.3 | 150 | Only hot air | — | — | 70 | 80 | 5 | 15 | 4 | 5 | 4 |
| Example 16 | UC1 | 1.5 | C1 | 35 | 7.5 | 1.3 | 280 | HP → hot air | 60 | 10 | 70 | 80 | 15 | 15 | 5 | 5 | 5 |
| Example 17 | UC3 | 1.5 | C4 | 43 | 7.5 | 1.3 | 280 | HP → hot air | 60 | 10 | 70 | 80 | 15 | 15 | 5 | 4 | 5 |
| Example 18 | UC3 | 1.5 | C5 | 28 | 7.5 | 1.3 | 280 | HP → hot air | 60 | 10 | 70 | 80 | 15 | 15 | 4 | 5 | 5 |
| Example 19 | UC3 | 1.5 | C6 | 40 | 7.5 | 1.3 | 280 | HP → hot air | 60 | 10 | 70 | 80 | 15 | 15 | 5 | 5 | 5 |
| Example 20 | UC3 | 1.5 | C7 | 30 | 7.5 | 1.3 | 280 | HP → hot air | 60 | 10 | 70 | 80 | 15 | 15 | 5 | 5 | 5 |

TABLE 4

| | Pre-treatment liquid | | Ink | | | | Viscosity of kneaded material (mPa·s) | | HP | | Drying step | | | | Evaluation result | | |
|---|---|---|---|---|---|---|---|---|---|---|---|---|---|---|---|---|---|
| | No. | Y (g/m²) | No. | Surface tension (mN/m) | X (g/m²) | 6.5Y/X | | Drying method | HP temperature (°C.) | HP time (s) | Wind speed of hot air (m/s) | Temperature of hot air (°C.) | Time from ink landing to start of hot air (s) | Time from start of hot air to end of hot air (s) | Image quality | Streak | Adhesiveness |
| Example 21 | UC1 | 1.5 | C1 | 35 | 7.5 | 1.3 | 280 | Only hot air | — | — | 70 | 80 | 15 | 15 | 5 | 5 | 5 |

TABLE 4-continued

| | Pre-treatment liquid | | Ink | | | Viscosity of kneaded material (mPa·s) | Drying step | | | | | | | Evaluation result | | |
|---|---|---|---|---|---|---|---|---|---|---|---|---|---|---|---|---|
| | | | Surface tension | X | | | Drying method | HP temperature (°C.) | HP time (s) | Wind speed of hot air (m/s) | Temperature of hot air (°C.) | Time from ink landing to start of hot air (s) | Time from start of hot air to end of hot air (s) | Image quality | Streak | Adhesiveness |
| No. | | Y (g/m²) | No. | (mN/m) | (g/m²) | 6.5Y/X | | | | | | | | | | | |
| Example 22 | UC1 | 1.5 | C1 | 35 | 7.5 | 1.3 | 280 | Only hot air | — | — | 70 | 80 | 5 | 7 | 5 | 5 | 4 |
| Example 23 | UC1 | 1.5 | C1 | 35 | 7.5 | 1.3 | 280 | Only hot air | — | — | 70 | 80 | 5 | 10 | 5 | 5 | 5 |
| Example 24 | UC1 | 1.5 | C1 | 35 | 7.5 | 1.3 | 280 | Only hot air | — | — | 70 | 80 | 5 | 50 | 5 | 5 | 5 |
| Example 25 | UC1 | 1.5 | C1 | 35 | 7.5 | 1.3 | 280 | Only hot air | — | — | 70 | 50 | 5 | 15 | 5 | 5 | 3 |
| Example 26 | UC1 | 1.5 | C1 | 35 | 7.5 | 1.3 | 280 | Only hot air | — | — | 70 | 60 | 5 | 15 | 5 | 5 | 4 |
| Example 27 | UC1 | 1.5 | C1 | 35 | 7.5 | 1.3 | 280 | Only hot air | — | — | 70 | 90 | 5 | 15 | 5 | 5 | 5 |
| Comparison Example 1 | UC1 | 1.5 | C1 | 35 | 7.5 | 1.3 | 280 | Only hot air | — | — | 10 | 80 | 5 | 15 | 5 | 5 | 1 |
| Comparison Example 2 | UC1 | 1.5 | C1 | 35 | 7.5 | 1.3 | 280 | Only HP | 80 | 15 | — | — | — | — | 5 | 5 | 1 |
| Comparison Example 3 | UC1 | 3.0 | C1 | 35 | 7.5 | 2.6 | 510 | Only hot air | — | — | 70 | 80 | 5 | 15 | 5 | 1 | 5 |
| Comparison Example 4 | UC1 | 0.2 | C1 | 35 | 7.5 | 0.2 | 10 | Only hot air | — | — | 70 | 80 | 5 | 15 | 1 | 5 | 3 |
| Comparison Example 5 | UC1 | 1.5 | C1 | 35 | 1.0 | 9.8 | 600 | Only hot air | — | — | 70 | 80 | 5 | 15 | 5 | 1 | 5 |
| Comparison Example 6 | UC1 | 1.5 | C3 | 35 | 7.5 | 1.3 | 20 | Only hot air | — | — | 70 | 80 | 5 | 15 | 1 | 5 | 3 |
| Comparison Example 7 | UC2 | 1.5 | C1 | 35 | 7.5 | 1.3 | 5 | Only hot air | — | — | 70 | 80 | 5 | 15 | 1 | 5 | 3 |
| Comparison Example 8 | UC1 | 1.5 | C1 | 35 | 7.5 | 1.3 | 280 | Only hot air | — | — | 70 | 30 | 5 | 15 | 5 | 5 | 1 |

As listed in Tables 3 and 4, in each example in which the drying step included hot air drying, the temperature was 40° C. or higher, the wind speed of hot air was greater than 15 m/s, and the viscosity of the kneaded material was 30 mPa·s to 500 mPa·s, the adhesiveness and the image quality of the image were excellent, and streaks (that is, streak-like image omission) were suppressed.

On the contrary, in Comparative Example 1 in which the wind speed of hot air was 15 m/s or less and Comparative Example 2 in which the drying step did not include hot air drying, the adhesiveness of the image was degraded.

In Comparative Examples 3 and 5 in which the viscosity of the kneaded material was greater than 500 mPa·s, the streaks were not able to be suppressed.

In Comparative Examples 4, 6 and 7 in which the viscosity of the kneaded material was less than 30 mPa·s, the image quality was degraded.

In Comparative Example 8 in which the temperature of hot air was lower than 40° C., the adhesiveness of the image was degraded.

Among Examples 1 to 5, in Examples 2 to 5 in which the wind speed of hot air was 30 m/s or greater, the adhesiveness of the image was more excellent.

Among Examples 2 to 5, in Examples 3 to 5 in which the wind speed of hot air was 50 m/s or greater, the adhesiveness of the image was more excellent.

Among Examples 7 and 9, in Example 9 in which the viscosity of the kneaded material was 50 mPa·s or greater, the image quality was more excellent.

Among Examples 6 and 8, in Example 8 in which the viscosity of the kneaded material was 400 mPa·s or less, the streaks were further suppressed.

Between Examples 9 and 10, in Example 10 in which the viscosity of the kneaded material was 70 mPa·s or greater, the image quality was more excellent.

Among Examples 4 and 8, in Example 4 in which the viscosity of the kneaded material was 300 mPa·s or less, the image quality was more excellent.

Among Examples 12 and 13, in Example 13 in which X was 4.0 or greater, streaks were further suppressed.

Among Examples 18 and 20, in Example 20 in which the surface tension of the ink at 25° C. was 30 mN/m or greater, the image quality was further improved.

Among Examples 17 and 19, in Example 19 in which the surface tension of the ink at 25° C. was 40 mN/m or less, the streaks were further suppressed.

Hereinbefore, the example group using a cyan ink as the ink has been described above, the present disclosure is not limited to the aspects of the example group.

For example, even in a case where the cyan ink is changed to an ink of a color other than cyan (for example, a magenta ink, a yellow ink, a black ink, or a white ink) in the above-described example group, it goes without saying that the same effects as the effects of the example group can be obtained.

The disclosure of JP2020-002641 filed on Jan. 10, 2020 is incorporated herein by reference in its entirety.

All documents, patent applications, and technical standards described in the present specification are incorporated herein by reference to the same extent as in a case of being specifically and individually noted that individual documents, patent applications, and technical standards are incorporated by reference.

What is claimed is:

1. An image recording method comprising:
   preparing a pretreatment liquid containing water and an aggregating agent;
   preparing an ink containing water and a colorant;
   applying the pretreatment liquid onto an impermeable base material, heating and drying the pretreatment liquid after applying the pretreatment liquid and before applying the ink, and applying the ink onto a region of the impermeable base material where the pretreatment liquid has been applied; and
   drying the ink applied onto the region to obtain an image,
   wherein the drying includes blowing of hot air at a temperature of 40° C. or higher and a wind speed of greater than 15 m/s to the ink applied onto the region, and
   wherein, when the number of grams of the ink applied per 1 $m^2$ in an image area with a density of 100% is defined as X, and the number of grams of the pretreatment liquid applied per 1 $m^2$ in the image area with a density of 100% is defined as Y, a viscosity of a kneaded material at 25° C. obtained by adding (6.5Y/X) mg of the pretreatment liquid to 10 g of the ink and defoaming and kneading the mixture at 200 rpm for 5 minutes is in a range of 30 mPa·s to 500 mPa·s, and X is 2.0 or greater.

2. The image recording method according to claim 1, wherein the wind speed of the hot air is 30 m/s or greater.

3. The image recording method according to claim 1, wherein the wind speed of the hot air is 50 m/s or greater.

4. The image recording method according to claim 1, wherein the viscosity of the kneaded material is in a range of 50 mPa·s to 400 mPa·s.

5. The image recording method according to claim 1, wherein the viscosity of the kneaded material is in a range of 70 mPa·s to 300 mPa·s.

6. The image recording method according to claim 1, wherein X is in a range of 4.0 to 25.0.

7. The image recording method according to claim 1, wherein (6.5Y/X) is in a range of 0.3 to 2.5.

8. The image recording method according to claim 1, wherein a surface tension of the ink at 25° C. is in a range of 30 mN/m to 40 mN/m.

9. The image recording method according to claim 1, wherein a time from when liquid droplets of the ink land on the region of the impermeable base material to when the blowing of the hot air to the liquid droplets is started is in a range of 2 s to 15 s.

10. The image recording method according to claim 1, wherein a time from when the blowing of the hot air to liquid droplets of the ink that have landed on the region of the impermeable base material is started to when the blowing of the hot air is ended is in a range of 10 s to 50 s.

11. The image recording method according to claim 1, wherein the pretreatment liquid further contains a resin.

12. The image recording method according to claim 1, wherein the ink further contains resin particles.

* * * * *